United States Patent
Auh et al.

(10) Patent No.: US 11,263,359 B2
(45) Date of Patent: Mar. 1, 2022

(54) SYSTEMS AND METHODS FOR GUIDED SELECTION VIA VISUALIZATIONS

(71) Applicant: Rockwell Automation Technologies, Inc., Mayfield Heights, OH (US)

(72) Inventors: Yong Y. Auh, Racine, WI (US); John P. Mason, Milwaukee, WI (US); Steven L. Fischer, Mequon, WI (US); Joel L. Wille, Milwaukee, WI (US); Richard E. Wandsnider, Cedarburg, WI (US); Gerald W. Renderman, West Bend, WI (US); Corey A. Peterson, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/035,661

(22) Filed: Sep. 28, 2020

(65) Prior Publication Data
US 2021/0150082 A1     May 20, 2021

Related U.S. Application Data

(60) Provisional application No. 62/937,036, filed on Nov. 18, 2019, provisional application No. 62/937,093, filed on Nov. 18, 2019.

(51) Int. Cl.
| | |
|---|---|
| *G06F 30/12* | (2020.01) |
| *G06Q 10/10* | (2012.01) |
| *G06F 9/451* | (2018.01) |
| *G06Q 30/06* | (2012.01) |
| *G06N 20/00* | (2019.01) |

(Continued)

(52) U.S. Cl.
CPC ......... *G06F 30/12* (2020.01); *G05B 19/4183* (2013.01); *G05B 19/4185* (2013.01); *G05B 19/41805* (2013.01); *G05B 19/41885* (2013.01); *G06F 9/451* (2018.02); *G06N 20/00* (2019.01); *G06Q 10/10* (2013.01);
(Continued)

(58) Field of Classification Search
CPC .............. G06F 30/12; G05B 19/41805; G05B 19/4183; G05B 19/4185
See application file for complete search history.

(56) References Cited

U.S. PATENT DOCUMENTS

| | | | |
|---|---|---|---|
| 10,394,970 B2 * | 8/2019 | Linehan .................. | G06F 30/20 |
| 2003/0120472 A1 * | 6/2003 | Lind ....................... | G06F 30/20 |
| | | | 703/13 |

(Continued)

*Primary Examiner* — Michael Roswell
(74) *Attorney, Agent, or Firm* — Fletcher Yoder, P.C.

(57) ABSTRACT

Systems and method for selecting option packs using guided selection via base designs. A processor may display visualizations that represent types of option packs associated with the industrial device assembly. Each visualization may include a slide visualization that moves selectable levels. The selectable levels may include a first selectable level and a second selectable level. For instance, the first selectable level may correspond to a first rating related to a respective operation of a respective type of option pack. After receiving a first selection of a type of option pack and a second selection representative of a selectable level, the processor may identify an option pack that corresponds to the first and second selections. In turn, the processor may generate an updated base design and layout based on the identified option pack.

20 Claims, 19 Drawing Sheets

(51) Int. Cl.
*G05B 19/418* (2006.01)
*G06F 111/16* (2020.01)

(52) U.S. Cl.
CPC ..... *G06Q 30/0623* (2013.01); *G06Q 30/0643* (2013.01); *G06F 2111/16* (2020.01)

(56) References Cited

U.S. PATENT DOCUMENTS

| | | | | |
|---|---|---|---|---|
| 2014/0095122 | A1* | 4/2014 | Appleman | G06F 30/13 703/1 |
| 2017/0308360 | A1* | 10/2017 | Kambach | G06F 8/36 |
| 2018/0349795 | A1* | 12/2018 | Boyle | G06Q 10/067 |
| 2021/0124850 | A1* | 4/2021 | Messervy | G06N 3/0454 |

* cited by examiner

FIG. 3

LOCATION* 182    INDUSTRY* 184

ELECTRICAL POWER 190

| | |
|---|---|
| LINE VOLTAGE: 460 VAC — 192 | FREQUENCY: 50Hz — 194 |
| ENCLOSURE TYPE: IP42 — 196 | SIMULTANEOUS LOAD: 50% — 198 |
| CONTROL VOLTAGE: 220-240 VAC E — 200 | FUTURE EXPANSION: 10% — 202 |
| HORIZONTAL BUS: 800A — 204 | ESTIMATED BUS SIZE: 475 AMPS — 206 |

LOAD LIST 208

| ITEM NO. 210 | POWER (kW) 212 | FULL LOAD AMPS 214 | APPLICATION 216 | MOTOR NAME 218 |
|---|---|---|---|---|
| 1 | 2.2 | | FAN | EAST VENTING |
| 2 | 2.2 | | FAN | WEST VENTING |
| 3 | 37 | | PUMP | PW LOOP T |
| 4 | 22 | | PUMP | PROCESS WW COLLECTION |
| 5 | 5.5 | | PUMP | GMO WW COLLECTION |
| 6 | 5.5 | | PUMP | NAOH 36% STORAGE |
| 7 | 22 | | PUMP | PW LOOP V |
| 8 | 4 | | PUMP | PW LOOP X |
| 9 | 7.5 | | PUMP | PW LOOP Y |
| 10 | 160 | | FAN | NORTH VENTING |

VIEW SUGGESTED CONFIGURATIONS — 220

FIG. 4

Input Panel (180):
- LOCATION* (222, 182)
- INDUSTRY* (190, 184)
- ELECTRICAL POWER
- LINE VOLTAGE: 460 VAC (192)
- FREQUENCY: 50Hz (194)
- ENCLOSURE TYPE: IP42 (196)
- SIMULTANEOUS LOAD: 50% (198)
- CONTROL VOLTAGE: 220-240 VAC E (200)
- FUTURE EXPANSION: 10% (202)
- HORIZONTAL BUS: 800A (204)
- ESTIMATED BUS SIZE: 475 AMPS (206)

Output Panel (230):

RECOMMENDATION (232/234) 💡 4, ⚙ 7 (236)
- ✓ POWER MONITOR
- ✗ INTELLIGENT SOFTWARE
- ✗ NETWORK PROVIDED
- ✗ HMI BASIC CONTROL STATION
- ✓ ARCSHIELD
- ✓ INSULATED BUS
- ✗ SAFETY RATING
- ✗ FOS 4B5
- ESTIMATED COST: $43,000.00 (238)
- [SELECT] (240)

INCREASE INTELLIGENCE (242) 💡 5, ⚙ 7
- ✓ POWER MONITOR
- ✓ INTELLIGENT SOFTWARE
- ✗ NETWORK PROVIDED
- ✗ HMI BASIC CONTROL STATION
- ✓ ARCSHIELD
- ✓ INSULATED BUS
- ✗ SAFETY RATING
- ✗ FOS 4B5
- ESTIMATED COST: $51,600.00
- [SELECT]

INCREASE SAFETY (244) 💡 4, ⚙ 8
- ✓ POWER MONITOR
- ✗ INTELLIGENT SOFTWARE
- ✗ NETWORK PROVIDED
- ✗ HMI BASIC CONTROL STATION
- ✓ ARCSHIELD
- ✓ INSULATED BUS
- ✓ SAFETY RATING
- ✗ FOS 4B5
- ESTIMATED COST: $55,900.00
- [SELECT]

| HOME | DESIGN | MY PROJECTS | |

∨ SYSTEM ATTRIBUTES — 572

| LINE VOLTAGE (VAC) | LINE FREQUENCY (Hz) |
|---|---|
| OIL & GAS ∨ | 50Hz ∨ |
| CONTROL VOLTAGE | HORIZONTAL BUS |
| 220–240 VAC ∨ | ISOLATED BUS ∨ |
| ENCLOSURE TYPE | LINE CABLE ENTRY |
| IP42 ∨ | LINE TOP CABLE ENTRY ∨ |
| LOAD UTILIZ TION | NEUTRAL BUS |
| 50% ∨ | NO NEUTRAL BUS ∨ |
| FUTURE UNIT SPACE | FUTURE MAIN CURRENT CAPACITY |
| NOT APPLICABLE ∨ | NOT APPLICABLE ∨ |
| LOAD CABLE EXIT LOCATION | WITHSTANDING RATING (ISSC) |
| LOAD BOTTOM CABLE EXIT ∨ | 65kA FOR 1 SECOND ∨ |

CALCULATED OPTIONS — 574

| HORIZONTAL BUS RATING (AMP) | MAIN CIRCUIT PROTECTION TYPE |
|---|---|
| 800A ∨ | MCCB ∨ |
| EST. 0A | |
| MAIN CIRCUIT BREAKING RATING | MAIN CIRCUIT BREAKER LINEUP POSITION |
| 800A ∨ | LEFT ∨ |
| EST. 0A | |

| SHIPPING BLOCK 39 | SHIPPING BLOCK 40 | SHIPPING BLOCK 41 |
|---|---|---|
| COLUMN 39-2500C-WXX-XXX | COLUMN 40-2500C-WXX-XXX | COLUMN 36-2500C-WXX-XXX |
| 39A DOL RESERVA 10kW | 40A DOL RESERVA 7.5kW | 41A DOL RESERVA 1 kW |
| | | 41B DOL RESERVA 1 kW |
| 39C DOL RESERVA 10kW | 40C DOL RESERVA 7.5kW | 41C DOL RESERVA 1 kW |
| | | 41D DOL RESERVA 1 kW |
| 39E DOL RESERVA 10kW | 40E DOL RESERVA 15kW | 41E DOL RESERVA 1 kW |
| | | 41F DOL RESERVA 1 kW |
| 39G DOL RESERVA 10kW | 40G DOL RESERVA 15kW | 41G DOL RESERVA 1 kW |
| | | 41H DOL RESERVA 1 kW |
| 39J DOL RESERVA 10kW | 40J DOL RESERVA 15kW | 41J DOL RESERVA 1 kW |

ALTERNATIVE DESIGNS ☐ APPLY SWAP BY KEYID  🔍 MOTOR DETAILS

HOA  +$35.00

NOTES:
DOL 0.18-7.5E300
CATALOG NUMBER: 2513-7P5-CP00-M-OL15-415-X...
NOTES: MODIFY SCHEMATIC FOR 24V PILOT LIGHTS

SWAP

DOL.37-1.5E1
CATALOG NUMBER: 2513-1P5-CP00-M-OL01-415-X...
NOTES: MODIFY SCHEMATIC FOR 24V PILOT LIGHTS

SWAP

SYSTEMS AND METHODS FOR GUIDED SELECTION VIA VISUALIZATIONS

CROSS-REFERENCE TO RELATED APPLICATIONS

This application claims priority to and the benefit of U.S. Provisional Application Ser. No. 62/937,036, entitled "AUTOMATICALLY GENERATING SCALABLE SINGLE-LINE DRAWINGS IN REAL TIME," filed Nov. 18, 2019, as well as U.S. Provisional Application Ser. No. 62/937,093, entitled "SYSTEM AND METHOD FOR GENERATING A MOTOR CONTROL CENTER LINEUP BASED ON A LOAD LIST," filed Nov. 18, 2019. These U.S. Provisional Applications are hereby incorporated by reference in its entirety for all purposes.

This application is related to co-pending U.S. Patent Application No. 20210150081, entitled "SYSTEMS AND METHODS FOR GENERATING BASE DESIGNS USING CLIENT DATA," and co-pending U.S. Patent Application No. 20210149377, entitled "SYSTEMS AND METHODS FOR GENERATING ETHERNET MODULES BASED ON BASE DESIGNS," each of which are incorporated herein by reference for all purposes.

BACKGROUND

The present disclosure is generally directed to techniques for generating base designs (e.g., motor control lineup) for an industrial automation system. More specifically, the present disclosure relates to techniques for generating recommendations for a base design based on customer requirements and preferences.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial systems may include various types of industrial device assemblies, such as motor control centers (MCCs), switchgear assemblies, and the like. Such industrial device assemblies are typically custom ordered from a manufacturer for a particular industrial site. Before submitting a purchase order for a particular industrial device assembly, including design of a layout of a corresponding industrial device assembly, a customer may define specifications of the industrial device assembly and submit the specifications of the industrial device assembly through an approval cycle.

Defining the specifications may involve the customer selecting or defining each parameter from a multitude of parameters (e.g., 10 parameters, 100 parameters) related to the industrial device assembly before ordering the industrial device assembly from a manufacturer. In some instances, because defining each specification and selecting every desired preference manually involves detailed knowledge about the industrial device assembly and the manufacturer, customers without technical backgrounds or intimate knowledge of the industrial device assembly may not be able to efficiently define the specifications. In some instances, the customer may not be aware of every available parameter that is accepted or used by a manufacturer when producing the industrial device assembly.

In addition to defining specifications, diagrams related to the industrial device assembly (e.g., a single-line diagram, an elevation drawing, an engineering document) may take time, as users using a computer-aided design (CAD) program or some other suitable tool generate the diagrams. That is, the user may receive customer data related to an electrical power system and related industrial devices, such as an electrical load list, and generate one or more diagrams representative of the electrical power system. Upon completion, the one or more diagrams may be rendered on a display in an application executing on a computer for viewing and review.

If the customer specifications, preferences, and/or customer data are changed during or after design of the industrial device assembly or a corresponding diagram, the industrial device assembly or one or more diagrams may require a re-design to meet the updated specifications, preferences, and/or customer data.

The process of designing and re-designing the industrial device assembly and/or the one or more diagrams can be arduous and time-consuming and may often contribute to long delays on a particular project at an industrial site. For example, the industrial device assembly may be subdivided into lineups, sections, units, or the like. Each lineup may have 1-N sections and each section may have 1-M units, which respectively contain at least one industrial automation device. Each lineup, section, or unit may be re-designed to meet the updated customer specifications which can lead to a significant delay at the industrial site.

Furthermore, before the industrial device assembly can be designed, updated customer data may need to be obtained. Thus, a customer may be queried multiple times to obtain the updated data. This may lead to further delays in the design process and may involve requesting data from the customer that is analyzed but not ultimately used.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for generating a layout based on a selected base design is provided. A processor may receive a selection of a visualization via a user input. The visualization represents a base design for an industrial device assembly, and the industrial device assembly includes electrical components. Further, the processor may display types of option packs associated with the industrial device assembly. Each visualization includes a slide visualization that moves selectable levels. A first selectable level corresponds to a first rating related to a respective operation of a respective type of option pack, and a second selectable level corresponds to a second rating related to the respective operation of the respective type of option pack. The second rating may be greater than the first rating. A first selection of a first visualization that corresponds to a first option pack type may be received. Additionally, a second selection of a first level from the first option pack type may also be received. The processor may identify a first option pack of one or more option packs based on the first selection and the second selection. The first option pack corresponds to operations related to the electrical components. An updated base design based on the first option pack may be generated, and a layout based on the updated base design may be displayed.

In a further embodiment, a system for generating a base design is provided. The system may include a processor, a memory storing instructions that, when executed by the processor, cause the processor to perform operations. The operations may include receiving a selection of a visualization via a user input. The visualization represents a base design for an industrial device assembly, and the industrial device assembly includes electrical components. Further, the operations include displaying types of option packs associated with the industrial device assembly. Each visualization includes a slide visualization that moves selectable levels. A first selectable level corresponds to a first rating related to a respective operation of a respective type of option pack, and a second selectable level corresponds to a second rating related to the respective operation of the respective type of option pack. The second rating may be greater than the first rating. A first selection of a first visualization that corresponds to a first option pack type may be received. Additionally, a second selection of a first level from the first option pack type may also be received. The operations may include identifying a first option pack of one or more option packs based on the first selection and the second selection. The first option pack corresponds to operations related to the electrical components. An updated base design based on the first option pack may be generated, and a layout based on the updated base design may be displayed.

In an additional embodiment, a non-transitory computer-readable medium storing instructions are provided. When executed by a processor, the instructions cause the processor to perform operations that include receiving a selection of a visualization via a user input. The visualization represents a base design for an industrial device assembly, and the industrial device assembly includes electrical components. Further, the operations include displaying types of option packs associated with the industrial device assembly. Each visualization includes a slide visualization that moves selectable levels. A first selectable level corresponds to a first rating related to a respective operation of a respective type of option pack, and a second selectable level corresponds to a second rating related to the respective operation of the respective type of option pack. The second rating may be greater than the first rating. A first selection of a first visualization that corresponds to a first option pack type may be received. Additionally, a second selection of a first level from the first option pack type may also be received. The operations may include identifying a first option pack of one or more option packs based on the first selection and the second selection. The first option pack corresponds to operations related to the electrical components. An updated base design based on the first option pack may be generated, and a layout based on the updated base design may be displayed.

BRIEF DESCRIPTION OF THE DRAWINGS

These and other features, aspects, and advantages of the presently disclosed embodiments will become better understood when the following detailed description is read with reference to the accompanying drawings in which like characters represent like parts throughout the drawings, wherein:

FIG. 3 illustrates a graphical user interface for receiving client data related to the motor control lineup of FIG. 2, according to one embodiment;

FIG. 4 illustrates a graphical user interface for selecting features of the motor control lineup of FIG. 3, according to one embodiment;

FIG. 15 illustrates a graphical user interface for allowing input of the client data of FIG. 8, according to one embodiment;

FIG. 17 illustrates a graphical user interface that depicts parameters associated with the option packs of FIG. 14, according to one embodiment;

FIG. 18 illustrates a graphical user interface for selecting the option packs of FIG. 14, according to one embodiment; and FIG. 19 illustrates a graphical user interface for swapping the selected base design of FIG. 9 with another base design, according to one embodiment.

DETAILED DESCRIPTION

Figure 1:
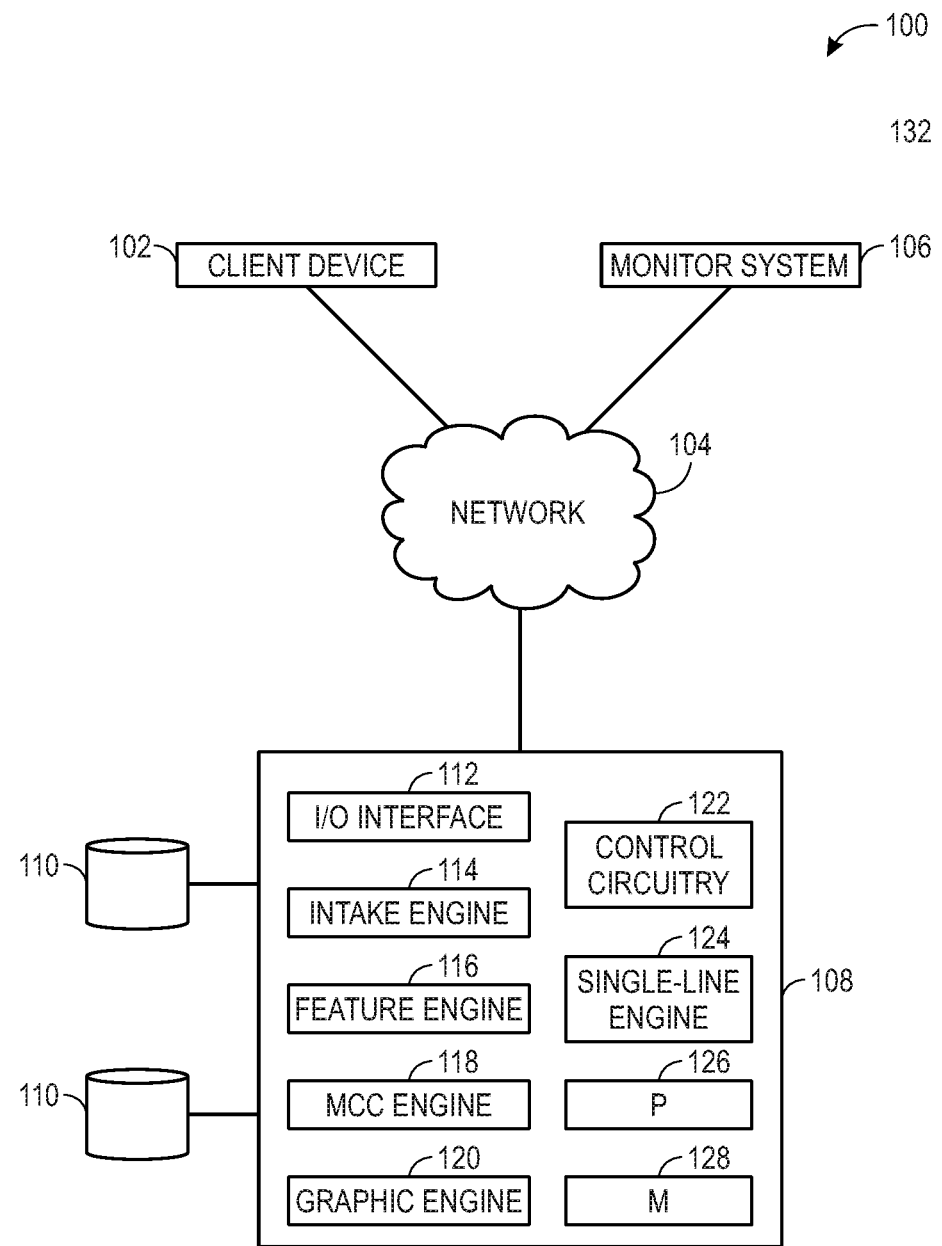
FIG. 1 illustrates a block diagram of a system for generating a motor control lineup and corresponding single-line diagram, according to an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification.

Industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump to perform an oil extraction process. Although examples are provided with regard to specific contexts, one of ordinary skill in the art will recognize that these examples are not intended to be limiting and that the techniques described herein can be used with any suitable context.

Further, an electrical load list (e.g., motor load list) provides electrical parameters for various electrical equipment of an electrical power system (e.g., an industrial automation system), including generators, switchgear, and electrical transformers. Based on the electrical load list and other defined specifications (e.g., data related to desired industry and location of a customer), a base design (e.g., motor control lineup) may be generated. The base design specifies attributes, model, components, lead time, catalog number, cost, description, name, related industry, and so forth associated with an industrial device assembly. As used herein, the lead time may involve the time between submitting a purchase order and completing production of the industrial device assembly. In particular, a motor control lineup is an assembly of control devices for one or more motors of the electrical power system that provide actuation and automation for a system. The motor control lineup may include a motor control center (MCC) or inverters (e.g., drives) coupled to a common bus. The motor control lineup may include motor starters, fuses or circuit breakers, and/or a power disconnect. A motor control lineup, which defines the control devices therein and a layout for the control devices, may be generated based on the electrical load list, data related to a desired industry, location of a customer, operations, and the like.

The data used to generate the base design (e.g., the motor control lineup) may be received from a customer via one or more questionnaires that include numerous questions relating to specific preferences of, and desired layouts of, the electrical system and the base design (e.g., the motor control lineup). However, the process of generating the base design (e.g., the motor control lineup) and layout may be time consuming and may involve requesting data from the organization that is analyzed but not ultimately used.

The embodiments herein provide techniques to streamline the process for generating the base designs (e.g., the motor control lineup), desired layouts, and diagrams (e.g., single-line diagram, elevation drawings, editable engineering drawings) by reducing customer input. Rather than having to complete numerous selections and questions, the customer may provide fewer inputs (e.g., 3 inputs, 5 inputs, 10 inputs) in the present embodiment and select a particular base design from a set of base designs generated by a computing system. By selecting the particular base design, the customer bypasses having to define each specification and answering numerous questions related to an industrial device assembly to submit a purchase order for a particular industrial device assembly. Using an intelligent, knowledge-based algorithm, the computing system may provide, via a graphical user interface (GUI), various selectable base designs and option packs to the customer based on customer inputs. As used herein, option packs represent additional selectable functional groups (e.g., safety attributes, system attributes, intelligence attributes, unit attributes) within each base design. The motor control lineup as used herein is an example of the base design. Prior to discussing the base designs and corresponding option packs in detail, generating the motor control lineup will be discussed. As such, FIGS. 1-6 illustrate generating and displaying the motor control lineup and layout and a corresponding single-line diagram.

Generating Single-Line Diagrams for an Industrial System

FIG. 1 illustrates a block diagram of a system 100 for generating a motor control lineup and a corresponding single-line diagram based on received inputs, according to an embodiment. The system 100 includes a client device 102, a monitor system 106, and a computing system 108, each connected to a network 104, for example, a wired local area network (LAN), a wireless local area network (WLAN), personal area network (PAN), wide area network (WAN), enterprise private network (EPN), the internet, etc.

The client device 102 may be a personal computer, such as a desktop computer, a portable computer, such as a laptop or notebook computer, or a smart device, such as a tablet, smart phone, human-machine interface (HMI), or the like. In the present embodiment, the client device 102 is used by a customer to input data related to an electrical power system, including electrical equipment, customer preferences, and so forth. Further, the client device 102 may also be used to control and/or modify operations of the electrical power system. The client device 102 transmits the input data to the computing system 108 via the network 104. The input data may include an electrical load list, a geographic location of the customer or the industrial site where the electrical power system will be installed, an industry of the customer or the electrical power system, and customer preferences related to, for example, safety and automation.

Examples of the industry input by the customer include "food and beverage," "oil and gas," "automotive," "marine," "chemicals," "cement," "metals," and the like. Examples of geographic locations provided by the customer include a hemisphere, a continent, a country, a state or province, a region within a country, and the like. The geographic location and industry associated with the customer may be obtained from a database, such as the database 110, which includes a user profile for each of a plurality of organizations.

The user profile for a given organization may include the geographic location associated with the organization, one or more industries in which the organization operates, historical data related to motor control lineups previously purchased by the organization, and other related data, such as preferences for a layout of a motor control lineup. The historical data may include, for example, safety features, such as arc containment enclosures previously purchased by the customer. The historical data may also include particular layouts of motor control lineups previously purchased by the customer or other organizations.

The monitor system 106 may monitor input data provided by one or more additional organizations that have currently or previously submitted data to the computing system 108. For example, the monitor system 106 may monitor data related to a plurality of one or more existing electrical systems that were designed using the computing system 108 or a similar device. The monitor system 106 may also monitor data related to one or more existing electrical systems that were not designed using the computing system 108 but that corresponding input data was received by the monitoring system or is stored in one or more databases 110. That is, some of the input data may be retrieved from one or more databases 110 where data for a plurality of organizations is stored.

The computing system 108 includes an input/output (I/O) interface 112, an intake engine 114, a feature engine 116, a motor control engine 118 (e.g., an MCC engine), a graphic engine 120, control circuitry 122, and a single-line engine 124. The computing system 108 also includes one or more processors 126 and one or more memory devices 128. In some embodiments, each engine 114, 116, 118, 120, 122, 124 may have its own processor 126 and/or memory device 128. In other embodiments, the engines 114, 116, 118, 120, 124 may share one or more processors 126 and/or one or more memory devices 128. The one or more memory devices 128 may include long-term and/or short-term storage and may be used for storing data and/or program instructions (e.g., machine readable code, algorithms, etc.). The one or more processors 126 may be used to execute the program instructions stored on the one or more memory devices 128. Further, the one or more processors 126 may be configured to retrieve data from the one or more memory devices 128 and to store data (data generated from executing the program instructions, or data received from other data sources) on the one or more memory devices 128.

The control circuitry 122 may be connected to one or more components of the computing system 108 (e.g., via a bus) and control operation of the components of the computing system 108. For example, the control circuitry 122 may identify when input data is received from the client device 102 and initiate an analysis of the input data by the intake engine 114.

The I/O interface 112 may be connected to the network to receive and transmit data, such as the input data. The intake engine 114 receives the input data from the I/O interface 112 and stores the input data in the databases 110. The intake engine 114 analyzes the input data and determines whether additional information should be requested from the customer. For example, the intake engine 114 may determine whether a location or industry has been provided by the customer. If not, the intake engine 114 may generate a request for this information to be sent to the customer.

A request for additional information may also be generated by the intake engine 114 based on the input data. For example, if the input data includes a load list, information specific to a particular load or corresponding motor, such as a voltage or current rating, may be requested form the user. The intake engine 114 may also receive input data from the monitor system 106 and store the data in one or more databases 110.

In some embodiments, load devices in the electrical load list may be used by the intake engine 114 to query existing designs of motor control lineups stored in the database 110 to determine suitable designs for the recommended motor control lineup. In this way, the load devices may dictate how the computing system 108 identifies suitable motor control lineup designs and the like.

The input data from the customer and the data in the database 110 may be in various formats. Thus, the intake engine 114 may include a programmatic interface that interprets and converts the data into a format which can be used in determining the recommended motor control lineup.

The feature engine 116 analyzes the input data from the customer (e.g., via the client device 102) and identifies features to be included in a recommended motor control lineup based on the input data. For example, the feature engine may identify an industry of the customer or corresponding industrial automation project 130. Based on the industry, the feature engine 116 may analyze the input data from the one or more additional organizations stored in the database(s) 110 to identify common features purchased by other organizations in the same or similar industry. The identified common features may be evaluated for possible inclusion in the recommended motor control lineup.

Similarly, organizations in the same or similar industry have similar preferences to satisfy local and/or national laws and/or guidelines. Thus, the feature engine 116 may also analyze the input data from the additional organizations, or previous input data from the same organization, to identify parameters used in previous motor control lineup designs. Based on the parameters, the feature engine 116 may identify particular features of the motor control lineup that are common to the customer, industry, and/or location of the industrial automation project 130. For example, if the industry input by the customer is "commercial bottling," the feature engine may identify motor control lineup features that are commonly requested or purchased by additional organizations in the "commercial bottling" industry based on the data in the database(s) 110 related to the additional organizations.

Further, the geographic location of the customer or the industrial automation project site may indicate certain parameters of the organization. The geographic location may be indicative a utility operating voltage, emissions standards, requirements of the electrical system to comply with local laws and/or guidelines, etc. For example, an industrial operating voltage (e.g., 110V or 240V), a control voltage (e.g., 12V or 24V) of the motor control lineup and the like. Similarly, the feature engine 116 may analyze data related to other organizations in a geographic location or region similar to that of the customer or the industrial automation project site. Thus, the feature engine 116 analyzes the data from previous motor control lineup designs for each organization that is similar to the requesting customer to determine particular features of the motor control lineup that may be common or similar to, for example, the industry and geographic location of the requesting customer.

The feature engine 116 may also identify particular features that are specifically requested by the customer or satisfy one or more specifications of the customer, including safety features and/or automation features. For example, in the input data, the customer may specifically request arc containment. In such an embodiment, the feature engine 116 identifies the specified feature (i.e., arc containment) and includes that feature in the motor control lineup. In some cases, the feature engine 116 may determine that additional input is needed from the customer, such as specific safety features to be included in the motor control lineup. Example safety features may include arc containment and withdrawable units. In some embodiments, the feature engine 116 may request the additional input from the customer.

In some embodiments, the feature engine 116 may include a machine learning model (not shown), which may be trained using historical data. For example, the machine learning model may include historical customer data from various industries and geographic locations. The machine learning model may be updated each time a motor control lineup recommendation is determined, or on some other schedule (after a set period of time has passed, after a set number of motor control lineup recommendations have been generated, etc.). The updated machine learning model may be used by the feature engine 116 so that subsequent motor control lineup recommendations take the most recent customer data into account.

In some embodiments, the machine learning model may also analyze how various users interact with the recommended motor control lineup. For example, the recommended motor control lineup may be presented to a user via a web browser executing on the client device 102. The machine learning model may monitor how the customer interacts with the recommendation in the web browser to analyze any changes or selections that are made and use these inputs as feedback for further training of the machine learning model. Monitoring and adding these interactions to the machine learning model may enable the machine learning model to continually improve its ability to provide recommendations to users and to other organizations that share certain similarities with the respective organization.

The MCC engine 118 receives the features to be included in the motor control lineup from the feature engine 116. The MCC engine 118 identifies particular control devices (e.g., power disconnects, breakers or fuses, motor starters, interlock switches, etc.) and corresponding parameters (e.g., arc containment, withdrawable units, etc.) for the recommended motor control lineup that allow the features identified by the feature engine 116 to work together. The MCC engine 118 may identify control devices based on the input data from the customer as well as historical data from the customer or from similar customers stored in the database(s) 110.

The MCC engine 118 may also determine a recommended layout of the control devices of the motor control lineup. A size (e.g., an overall height, an overall width, and an overall length) of the motor control lineup may be specified by a customer in the input data or may be determined based on the historical data. For example, the MCC engine 118 identifies a size of each control device and determines one or more recommended layouts of the control devices such that the control devices fit within the size of the motor control lineup specified by the customer.

The graphic engine 120 generates a graphical representation of the one or more recommended layouts of the motor control lineup to be rendered on a display of the client device 102. The graphical representation may be formatted to be displayed in a web browser or native application executing on the client device 102. The graphical representation may include each of the control devices identified by the MCC engine 118. In some embodiments, the graphical representation may be an elevation view of the motor control lineup.

The single-line engine 124 may generate a single-line diagram representing the motor control lineup. The single-line diagram may be a visual representation of the electrical system(s) of the industrial automation project 130. The electrical system may be complex and the single-line diagram provides a simplified visual representation of the electrical system in two-dimensions. To generate the single-line diagram, the single-line engine 124 may generate a graphical object for each of the electrical equipment in the electrical load list and each of the control devices in the motor control lineup. The graphical objects may be generated using scalable vector graphics, as discussed in more detail below.

If the input data is updated or modified by the customer, the computing system 108 may dynamically update the recommended motor control lineup and corresponding features, the layout of the motor control lineup, the graphical representation of the layout of the motor control lineup, and the single-line diagram based on the updates/modifications provided by the user. For example, if a new load is added to the electrical load list, the MCC engine 118 may determine that a new control device is to be added to the motor control lineup. The MCC engine 118 may also determine that one or more parameters (e.g., a voltage or current capacity) of one or more of the control devices is to be updated based on the new load. The graphic engine 120 may dynamically update the graphical representation of the motor control lineup to include the new or updated control device. The single-line engine 124 may also generate a new or updated graphical object to be included in the single-line diagram.

Figure 2:
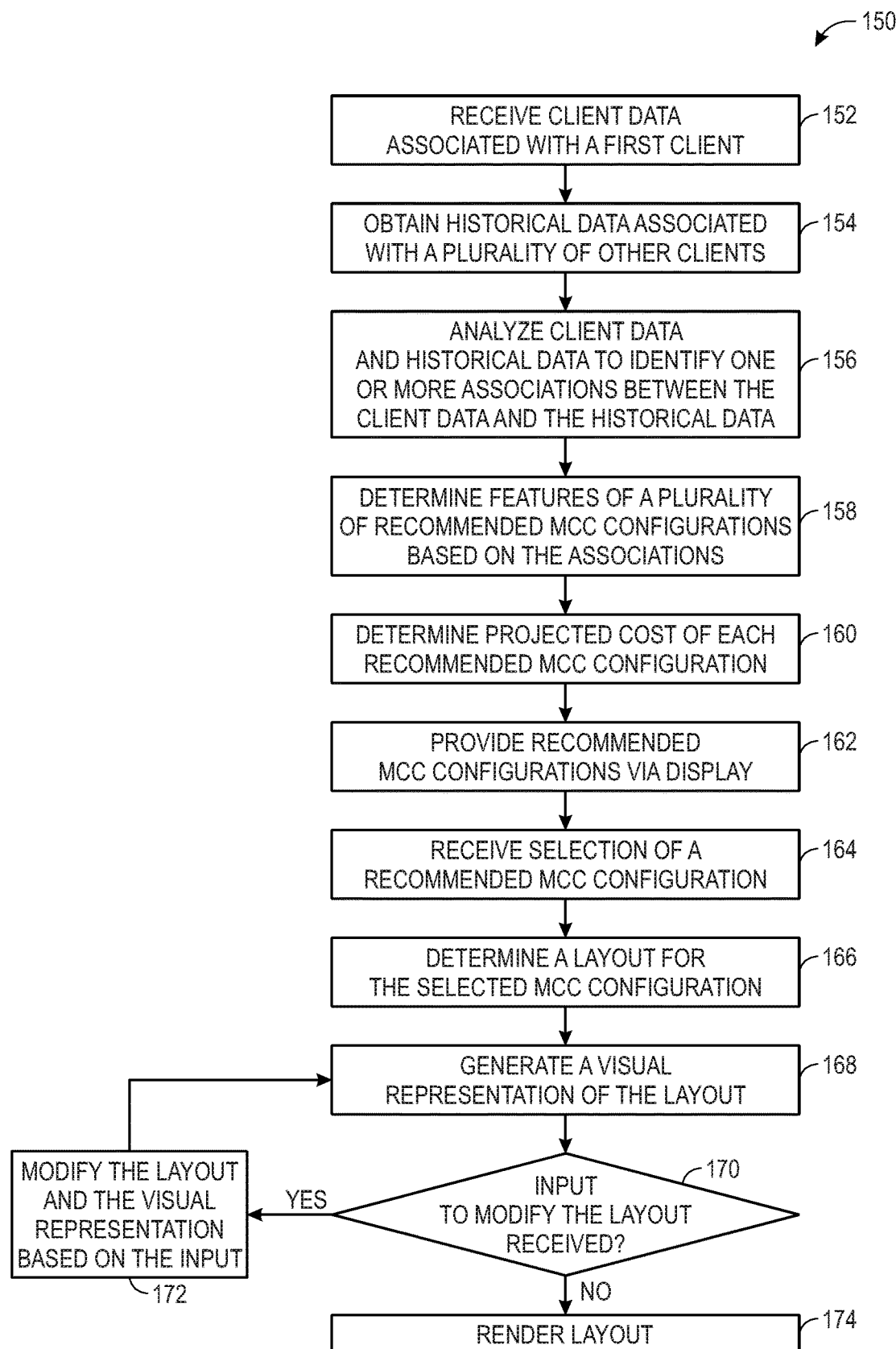
FIG. 2 illustrates a flow chart of a process for generating a motor control lineup, according to an embodiment.

FIG. 2 illustrates a flow chart 150 of a process for generating a recommended motor control lineup based on inputs provided by a customer. The flow chart 150 begins at operation 152 where input data associated with a first client (i.e., the customer) is received. The input data may be obtained directly from the first client (e.g., input via a graphical user interface) or from a database. That is, the input data may represent near real-time (e.g., current as of seconds, minutes, hours, days, etc.) specifications and preferences of the first client.

At operation 154, historical data associated with the customer requesting the design, or a plurality of other customers is obtained. The historical data may be obtained from a database, directly from the customer requesting the design, or directly from one or more of the plurality of other customers. For example, the historical data may be obtained from the database(s) 110 or directly from the monitor system 106 discussed with respect to FIG. 1.

At operation 156, the input data and the historical data are analyzed to identify one or more associations between the input data and the historical data. The one or more associations between the input data and the historical data may be similarities between the input data and historical data. For example, a same or similar geographic location, industry, and/or product/process may be identified between the first client and one or more previous designs for the customer or the plurality of other customers. In such an embodiment, the one or more of the plurality of other customers may be associated with the first client.

If the geographic location of a project provided by the first client is a region within a country, the corresponding country may be the same or similar to that of one or more previous projects from the same customer or the plurality of other customers. That is, the intake engine 114, discussed with respect to FIG. 1, may identify a broader geographic region or country than that provided by the first client. Thus, the number of previous projects having a same or similar geographic location may be increased to widen the scope for possible matches and give a better recommendation for the motor control lineup.

At operation 158, one or more features of the recommended motor control lineups are determined based on the input data and the historical data. Some of the features may be common across each of the one or more recommended motor control lineups. For example, each recommended lineup may include four motor starters and four disconnects. The recommended lineups may differ in features related to safety, such as arc containment, and intelligence, such as remote monitoring and access for remote control and remote reset of control devices.

The features determined at operation 158 may also include various electrical parameters of the motor control lineup including a bus voltage, a frequency, a control voltage, an operating electrical load, and a maximum electrical load. The electrical parameters may be determined based on the input data and the historical data. For example, a bus voltage for the motor control lineup may be determined based on the geographic location provided in the input data and bus voltages of motor control lineups in the same or similar geographic locations found in the historical data.

At operation 160, a projected cost of the recommended motor control lineup is determined. The cost may take into account the various electrical parameters, the control devices, safety features, and any other specifications or parameters requested by the customer. For example, price data for each component and/or service may be stored (e.g., in the database), or retrieved and then summed according to the recommended motor control lineup to determine the projected cost of the system. The projected cost may be provided to the customer in one or more currencies.

At operation 162, the computing system 108 discussed with respect to FIG. 1 may generate one or more graphical objects representing features of the recommended motor control lineups. The recommended motor control lineups may be rendered as a summary or as a list of features included in each lineup via a display of the client device. Some features may be common to each recommended motor control lineup, such as arc containment, while other features may differ between the recommended lineups, such as intelligence options. The recommended motor control lineups are rendered on the display to be presented to the customer. In some embodiments, the recommended motor control lineups may be presented to the customer as elevation views. For example, an elevation view may be a visual representation of a front face of the recommended motor control lineup, as depicted within the graphical user interface illustrated in FIG. 5. If the customer selects (e.g., clicks on) one of the recommended motor control lineups, the computing system may then present an elevation view of the selected motor control lineup to the customer, as discussed in more detail below.

At operation 164, the computing system receives a selection of one of the recommended motor control lineups. For example, if the recommended motor control lineups are presented to the customer in a web browser, the computing system may receive a selection of one of the lineups when the customer clicks on that lineup.

At operation 166, the computing system determines a layout of the selected motor control lineup. The layout may include a position of each control device within the physical motor control lineup. The physical motor control lineup may include one or more vertical sections. Each of the one or more vertical sections may include one or more of the control devices. Each section of the selected lineup may include various control devices having a common power. Thus, the computing system may identify a power common to one or more of the control devices of the selected lineup. For example, one section of the selected motor control lineup may include control devices with a common control voltage of about 24 volts. Another section of the selected lineup may include control devices having a common control voltage of about 12 volts. As another example, one section of the selected motor control lineup may include various control devices having a common bus voltage of about 220 volts.

At operation 168, the computing system generates a visual representation of the layout of the selected motor control lineup. To do so, the computing system may generate one or more graphical objects for each section of the selected motor control lineup. In some embodiments, the computing system may generate a graphical object for each control device. Upon display to the user, the user may provide inputs that modify the proposed layout.

At operation 170, the computing system determines if an input to modify the layout of the selected motor control lineup has been received. If so, the computing system modifies the layout of the motor control lineup based on the received input at operation 172. The computing system then updates the visual representation of the modified layout at operation 168.

If no input to modify the layout is received and/or the user provides affirmative approval of the proposed layout, the computing system renders the visual representation of the selected motor control lineup at operation 174. The visual representation may be rendered at the client device via a web browser or native application executing thereon.

Once rendered, the computing system may continue to monitor for additional input indicating a modification to the MCC layout. If an additional input is received, the layout of the lineup may be modified at operation 172 and the visual representation may be updated based on the additional input at operation 168. The modified visual representation may be rendered at operation 174.

FIG. 3 illustrates a graphical user interface (GUI) 175 for receiving inputs of client data. The GUI 175 may be presented to a customer via a client device, such as the client device 102 discussed with respect to FIG. 1. The GUI 175 may be presented to the customer via a web browser or a native application executing on the client device. As illustrated, the GUI 175 includes a first input portion 180, which includes a number of fields for customer or project specific data. A second input portion 208 is provided for receiving inputs defining an electrical load list.

The first input portion 180 includes data fields for a location 182 of the customer or the industrial automation project 130 and an industry 184 of the customer or the industrial automation project 130. The first input portion 180 also includes data fields for electrical power requirements of the customer or the industrial automation project including a line voltage 192, a frequency 194, an enclosure type 196, a simultaneous load 198, a control voltage 200, a future expansion 202, a horizontal bus rating 204, and an estimated bus size 206.

As shown, one or more data fields on the GUI 175 may include an asterisk (*) 222. The asterisk 222 may indicate a "required" data field which is a minimum required data for the computing system to generate a recommended motor control lineup. Data fields that do not include the asterisk 222 may be optional data fields to be completed by the customer which may improve an accuracy of the computing system to provide a relevant recommendation of a motor control lineup. For example, the line voltage 192 may be input by the customer if known to indicate a voltage of the area or region where the industrial automation project site, and thus the motor control lineup, is or will be located. Similarly, the frequency 194 may indicate a line frequency in the area or region where the motor control lineup will be installed. Data fields that do not include the asterisk 222 may be obtained by the computing system from the electrical load list.

The enclosure type 196 may indicate a minimum enclosure rating for the various control devices in the motor control lineup. The enclosure type 196 may be a customer preference or may be a requirement of a local law or standard for the location or the industry of the industrial automation project 130. The simultaneous load 198 may indicate a percentage of the loads in the load list provided in the second data input portion 208 which may be active at any given time during operation of the motor control lineup.

The control voltage 200 may be a range or average of the control voltages for all control devices in the motor control lineup. The control voltage 200 may also be a maximum control voltage for the motor control lineup. The future expansion 202 may indicate a percentage of the motor control lineup that is to be reserved for potential future expansion for the industrial automation project 130. For example, the future expansion 202 field may indicate a percentage of the volume (e.g., space) of the motor control lineup that is to be left empty for control devices to be added in the future. That is, the customer may estimate a number of control devices to be added to the motor control lineup in the future and reserve a percentage of the motor control lineup for that purpose.

As should be understood that the data fields shown in the GUI 175 are merely examples and many other data types of data may be requested to be input by the customer. Further, data input into the data fields of the first input portion 180, such as the line voltage 192, the frequency 194, the horizontal bus rating 204, and the estimated bus size 206 may be used by the computing system as baseline values. However, the computing system may determine that a different value is needed for these data fields based on the electrical load list.

The second input portion 208 for the electrical load list may include a list of all expected electrical loads in the industrial automation project 130. That is, the load list is a collection of all expected loads to be connected to one or more power supplies, such as generators. The second input portion 208 may include one or more columns representing various electrical parameters of each load. As illustrated, the electrical load list in the second input portion 208 includes a line item number 210 for each load. Data for each load may include a power 212, a full load amp (i.e., electrical current) rating 214, a type or application 216 of the load, and a corresponding motor name 218.

It should be understood that the electrical load list may include any number of electrical parameters specific to all or some of the electrical loads. For example, the electrical load list may include electrical parameters for each load such as a nominal rating, a power factor, an efficiency, a consumed load, a load factor, and the like. It should also be noted that the layout of GUI may be changed without changing a scope or function of the embodiments described herein. For example, a position of the first input portion 180 the second input portion 208 may be interchanged, or otherwise positioned differently than shown in FIG. 3.

FIG. 4 illustrates the graphical user interface 175 depicting a screen for receiving selection of features of a motor control lineup. As shown, the first input portion 180 is similar to that illustrated in FIG. 3. However, a third input portion 230 depicts one or more recommended motor control lineups 232, 242, 244. Each recommended motor control lineup 232, 242, 244 may include a title 234, a list of one or more features 236, and an estimated cost 238. The title 234 and the list of features 236 may be generated by the computing system based on the input data provided by the customer.

The list of features 236 may be common to each recommended motor control lineup 232, 242, 244, facilitating ease of comparison between the recommended motor control lineups 232, 242, 244. Each individual feature of the list of features 236 may be identified as included or not included in a particular recommended motor control lineup by a visual object presented in the GUI 175. For example, the feature of intelligent software is not included in the recommended motor control lineups 232 and 244, as indicated by an 'X' next to the intelligent software feature. However, the intelligent software is included in the recommended motor control lineup 242 as indicated by a checkmark next to the intelligent software feature. Some features 236 of the list may be common to each recommended motor control lineup 232, 242, 244. For example, each recommended motor control lineup 232, 242, 244 includes a power monitor and an insulated bus, as indicated by the checkmarks shown in each recommended motor control lineup 232, 242, 244.

In some embodiments, each recommended motor control lineup 232, 242, 244 includes a safety indicator and an intelligence indicator. The safety and intelligence indicators provide a fast and efficient visual comparison for each recommended motor control lineup. As shown, the safety and intelligence indicators of the recommended motor control lineup 242 indicate an increased intelligence level while the safety and intelligence indicators of the recommended motor control lineup 244 indicate an increased safety level, in accordance with the titles 234.

Each recommended motor control lineup 232, 242, 244 also includes a visual object that the customer can click on or otherwise choose to indicate a preference of the respective motor control lineup 232, 242, 244. As shown, each motor control lineup 232, 242, 244 includes a "Select" visual object that can be selected by the customer.

In some embodiments, the customer may interact with the third input portion 230 to select one or more features in the list of features 236 that are indicated as not included in a particular recommended motor control lineup. For example, the customer may be able to select a "Safety Rating" feature in the recommended motor control lineup 242. The feature may be selected by clicking on the feature or the corresponding inclusion indicator (e.g., the check mark or 'X').

Based on this user input, the system may check to determine whether there is an existing motor control lineup having the specified combination of features, and if not, attempt to create a custom motor control lineup having the specified combination of features. The system may then update the third input portion 230 based on the user feedback to include the motor control lineup having the specified combination of features. In some embodiments, all of the motor control lineup options in the third input portion 230 of the GUI 175 may be updated based on the user feedback. For example, the third input portion 230 of the GUI 175 may update to display a selection of motor control lineup options that all include and/or omit the features toggled by the user according to the user's inputs.

Figure 5:
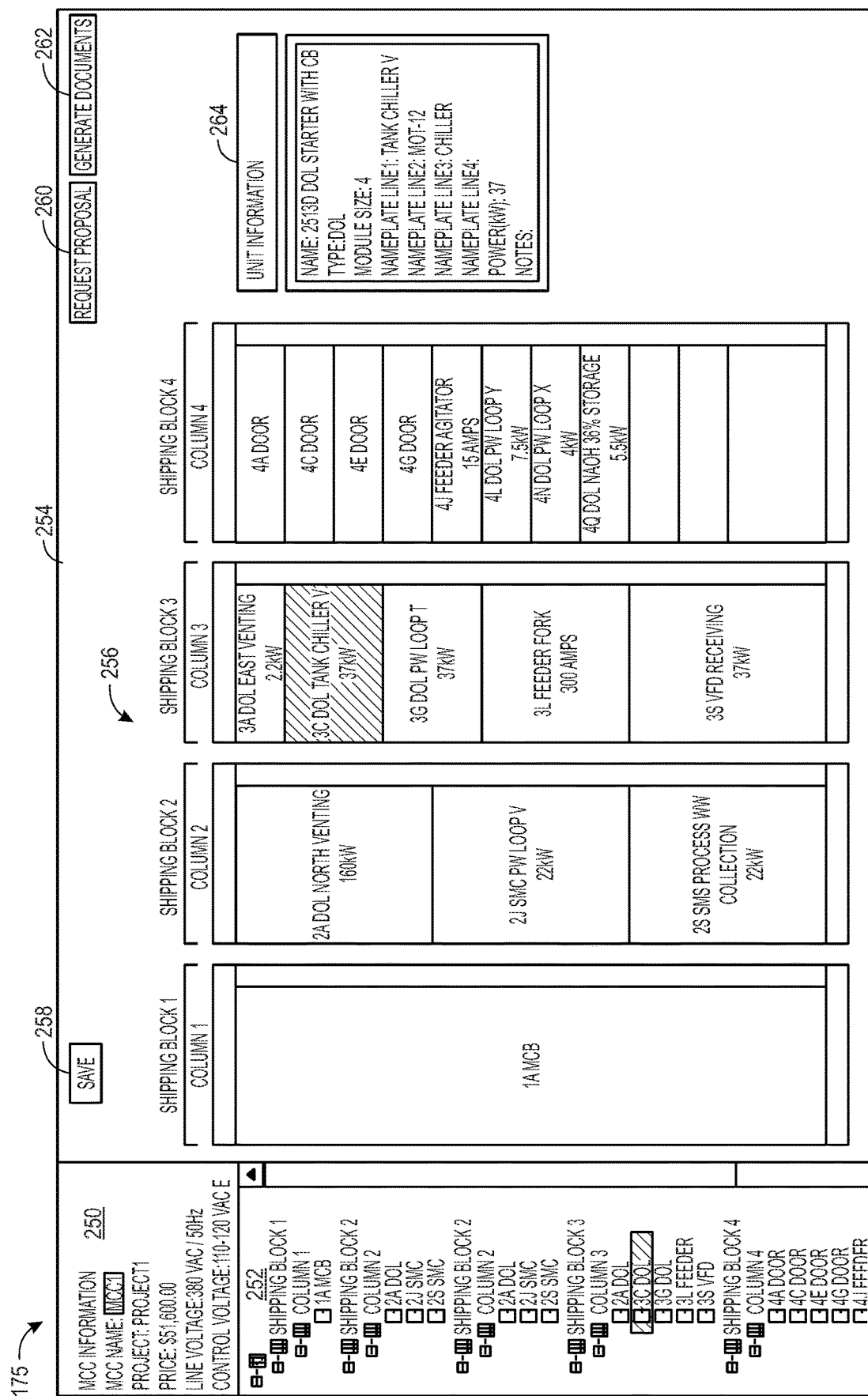
FIG. 5 illustrates a graphical user interface for determining a layout of the motor control lineup of FIGS. 3 and 4, according to one embodiment.

FIG. 5 illustrates the GUI 175 for reviewing a proposed layout of an MCC, according to one embodiment. Once the customer chooses features for the motor control lineup as discussed above, the computing system may generate a graphical representation of the chosen lineup and render that representation in a fourth portion 254 of the GUI 175. A fifth portion 250 of the GUI 175 may include general information regarding the motor control lineup and a corresponding industrial automation project 130. A sixth portion 252 of the GUI 175 may include a nested or collapsible/expandable line item view of the motor control lineup.

As shown, the graphical representation of the chosen motor control lineup depicted as a motor control center (MCC) lineup may be an elevation view 256. The elevation view 256 may include one or more sections or columns of the motor control lineup. The sections of the motor control lineup may be a visual representation of how the motor control lineup will be shipped to the customer or to the industrial automation project site. The elevation view 256 may include a block representing at least each control device included in the electrical load list, discussed above.

The elevation view 256 may be interactive such that the customer can click on and drag the individual blocks of the motor control lineup to different locations within the corresponding column or a different column. For example, the customer may click on the second block in "Column 3." When a block is selected, that block may be highlighted, as shown. A corresponding line item in the collapsible line item view in the sixth portion 252 may also be highlighted, as shown. Further, an information block 264 may be rendered in the GUI 175 showing specific data related to the selected block.

Once the block is selected, the customer may be able to drag the selected block higher or lower in "Column 3" of the elevation view 256 or to a location in a different column. Once the block is moved, the computing system may re-determine a layout of the motor control lineup and render an updated elevation view 256 including the changes. For example, if the selected block is moved to a column having blocks of sizes different than a size of the selected block, one or more other blocks may be moved fill the vacant space left by the selected block as well as ensure sufficient space in the column with the new location of the selected block.

The GUI 175 may also include various functional buttons that can be used during design of the motor control lineup or after a final layout is determined. For example, a first button 258 may be used to save any changes made to the motor control lineup. A second button 260 may generate and submit a request for proposal to the manufacturer of the motor control lineup. A third button 262 may generate one or more documents related to the motor control lineup. For example, the documents related to the motor control lineup may include a request for proposal, a request for quotation, a corresponding single-line diagram, a formal elevation view, and the like. Each of the one or more documents may be generated in any format, including a text document, a portable document format (PDF), an image, or the like.

Figure 6:
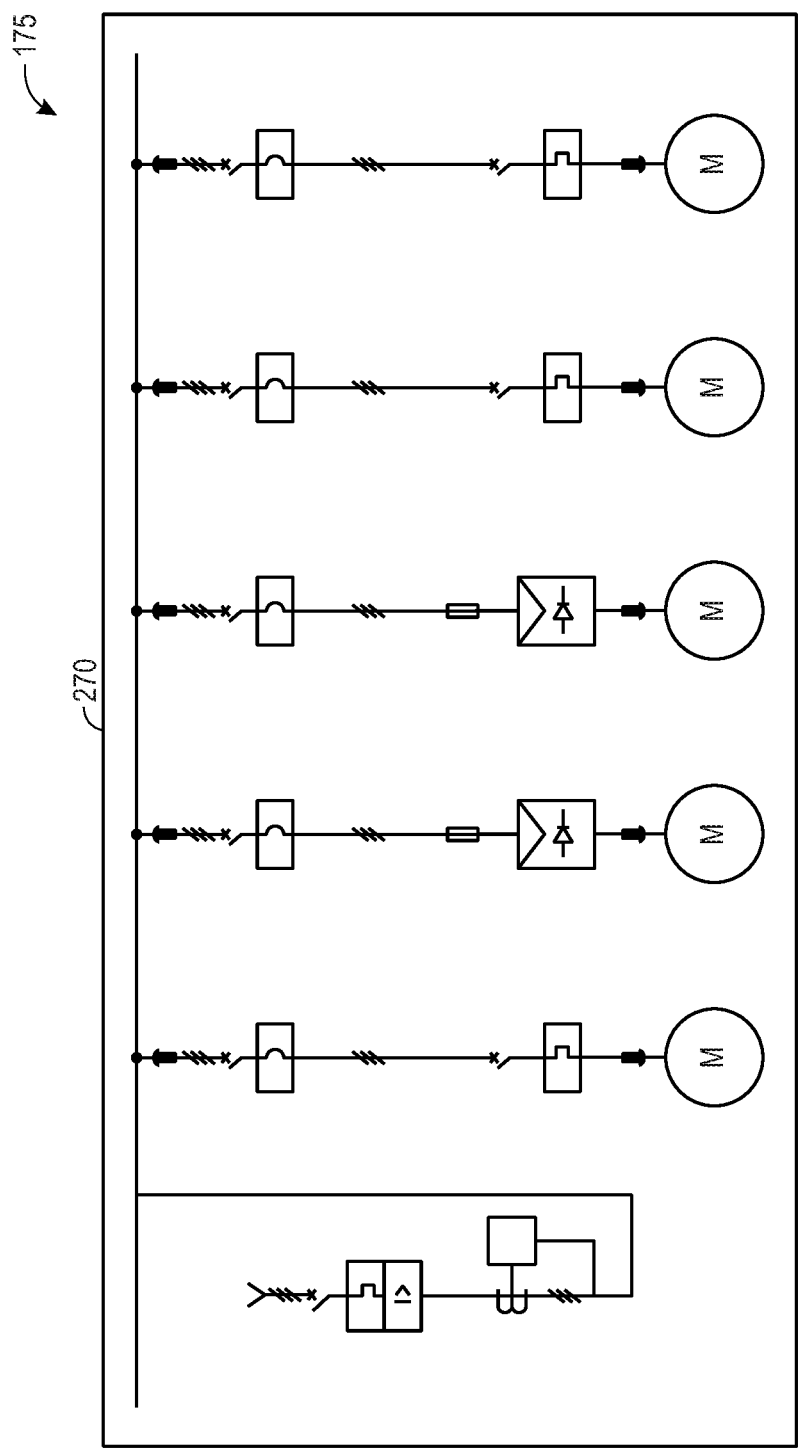
FIG. 6 illustrates a single-line diagram dynamically generated by the system shown in FIG. 1, according to one embodiment.

FIG. 6 illustrates a single-line diagram 270 generated by the system and displayed in the graphical user interface 175, according to one embodiment. The single-line diagram 270 provides a visual representation of the electrical systems of the industrial automation project 130, including the control devices of the motor control lineup. The single-line diagram 270 may be dynamically generated by the computing system at any time during the MCC recommendation process described herein. For example, the single-line diagram may be generated when the customer inputs data including an electrical load list into the GUI 175, as discussed above. As any changes are made to the input data or preferences of the customer, the computing system may update the single-line diagram to reflect those changes. Thus, the single-line diagram is a visual representation of the motor control lineup as modified by the customer.

Single-line diagrams are typically manually generated by a user using a computer-aided design (CAD) program or some other suitable tool. That is, the user may receive information related to an electrical power system, such as an electrical load list and generate a single-line diagram representative of the electrical power system. This process to generate a single-line diagram may be resource intensive and time consuming. Further, any changes or corrections made to the single-line diagram adds to the process and increases the amount of time used to generate the diagram. Thus, the embodiments described herein provide techniques to dynamically generate a single-line diagram for viewing in real-time during a design phase of an industrial automation project as the electrical load items or customer preferences are changed or added to the design in real-time. The single-line diagram may be dynamically modified while the electrical load list is generated, modified, or the like.

To generate the single-line diagram 270, the computing system may receive an input representative of one or more electrical components from the load list. The load list may be fully or partially completed. As the computing system receives each input of the load list, the computing system may identify a graphical object representative of a corresponding component in the load list. Before generating the graphical objects, the computing system may identify a web browser or application used by the customer. The computing system may generate the graphical objects in a format that is compatible with the web browser or native application employed by the customer.

After a particular the graphical object is generated, the computing system may dynamically add that graphical object to a single-line diagram presented via the web browser or native application used by the customer. Thus, the single-line diagram presents a real-time visual representation of the electrical equipment that are part of the load list at any given time. Further, as changes are made to the electrical load list, the computing system may dynamically update the graphical objects, such that the single-line diagram is updated to reflect the changes as the changes are made. That is, the computing system dynamically generates and updates the single-line diagram to reflect a current state of the electrical load list.

Connections between the graphical objects of the single-line diagram may be generated while the graphical objects corresponding to the components of the load list are generated. In some embodiments, the connections may be generated after all current graphical objects are generated and rendered in the single-line diagram. Thus, in some embodiments, generating and rendering the connections between components of the single-line diagram may be performed concurrently with generating and rendering the graphical objects representing the components of the load list. In other embodiments, generating and rendering the connections may be performed as separate operations from generating and rendering the graphical objects corresponding to the components of the load list, respectively. The connections between components may be generated as part of the graphical objects representing the component of the load list or as additional graphical objects.

In some embodiments, the load list is generated by the customer directly on the server using a web-based application. In that case, the computing system may continually analyze the load list and generate a graphics object for each electrical component thereof. As the graphics objects are generated, the computing system may update the single-line diagram presented on the display. That is, as additional pieces of electrical equipment are added to the load list, the single-line diagram is updated by the computing system.

Thus, a current view of the single-line diagram in the web browser or application corresponds to the current electrical load list.

Moreover, the current view of the single-line diagram may be distributed to a number of computing systems communicatively coupled to the computing system receiving the input. With this in mind, in some embodiments, the customer may provide the load list remotely via a network to supervisors, subordinates, clients, customers, vendors, suppliers, contractors, etc. As such, a server computing system may receive and analyze the load list to identify various electrical equipment that are part of the load list. The server computing system may generate a graphical object for each electrical equipment in the load list.

In some embodiments, the server computing system may generate the graphical objects as scalable vector graphics (SVG). In other embodiments, the format of the graphical objects (and the single-line diagram) is a format other than SVG, such as encapsulated postscript (EPS), portable document format (PDF), or raster graphics. In any case, the server computing system or any other suitable computing system may dynamically convert the input data representative of the load list items into graphical objects interpretable by the computing system intended to receive the single-line diagram visualization.

In some embodiments, the server computing system may convert the input data from JSON data to SVG data as the input data is received, such that the server computing system may send the SVG data to the computing device, which may generate the single-line diagram visualization based on the SVG data. In some embodiments, the input data, the single-line diagram, or the graphical object data may also be used to generate an elevation view that represents how components that are part of the single-line diagram may be positioned within an enclosure or a collection of enclosures.

Figure 7:
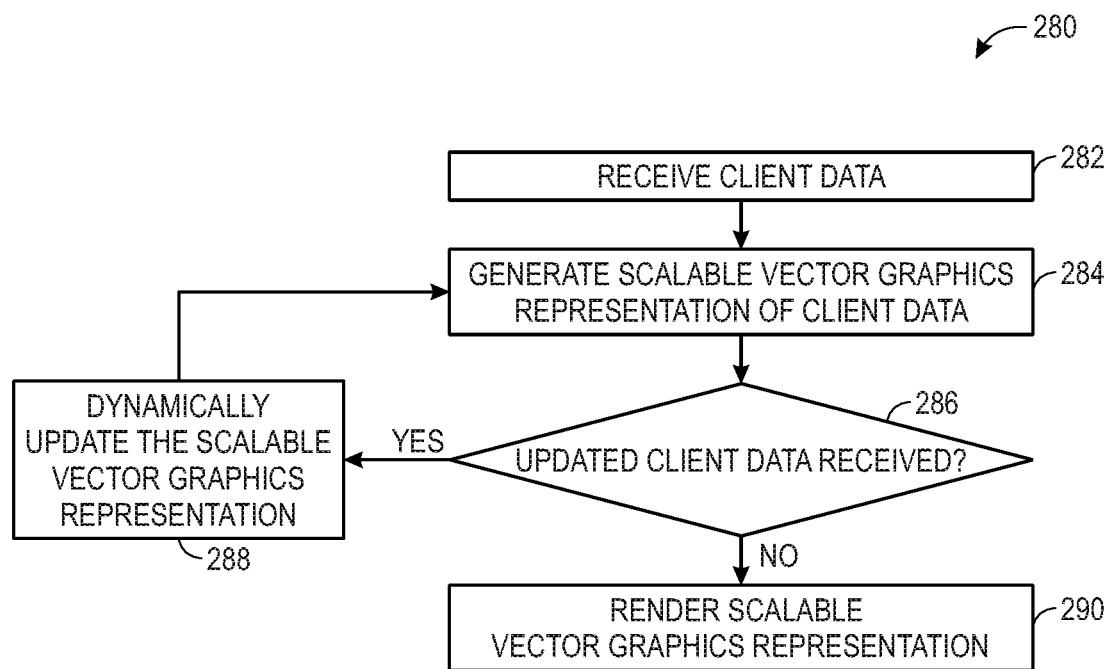
FIG. 7 illustrates a flow chart of a process for dynamically generating the single-line diagram shown in FIG. 6, according to one embodiment.

FIG. 7 illustrates a flow chart 280 of a process for dynamically generating a single-line diagram, according to one embodiment. The flow chart 280 begins at operation 282 where input data is received (e.g., via the GUI). The input data may include an electrical load list and any other relevant customer data including preferences or specifications. The electrical load list may include, for example, generators, motors, corresponding control devices, and the like. The input data may be provided by the customer via a graphical user interface (GUI) such as that described above with respect to FIGS. 3-5.

At operation 284, the computing system generates a graphical object representative of each item in the electrical load list. The graphical object may be generated by applying a set of rules to the items in the electrical load list. For example, the computing system may generate a scalable vector graphics (SVG) object for each item in the load list at a current time. The computing system may determine a layout of the SVG objects based on the input data in the electrical load list and the recommend motor control lineup. For example, the computing system may determine what SVG objects of the single-line diagram are to be connected to each other and in what order along a given load line. The computing system may utilize historical data from the customer or the additional customers to determine connections between the SVG objects and an order of the SVG objects in the single-line diagram.

Once the single-line diagram is generated, the graphical objects may be stored in one or more databases, such as the databases 110 discussed with respect to FIG. 1. Further, the graphical objects and the single-line diagram may be stored and used to train a machine learning model. For example, the machine learning model may include historical single-line diagrams (including corrections or changes made to the single-line diagram by an associated customer) and corresponding motor control lineups to ensure the most recent customer data is taken into account. Further, the machine learning model may improve an accuracy of the single-line diagram by using the most recent customer data.

At operation 286, the computing system determines if updated input data has been received. For example, the computing system may identify a modification to the previously received input data or new input data.

If updated input data is received, the computing system may modify one or more of the scalable vector graphics objects or generate one or more new scalable vector graphics objects as needed, at operation 288. If the computing system does not detect updated input data, the scalable vector graphics representation of the electrical load list is rendered to be presented to the customer at operation 290. That is, the computing system renders each scalable vector graphics object in the form of the single-line diagram.

In summary, one or more recommended motor control lineups and a single-line diagram may be dynamically generated from an electrical load list. Regarding the recommended motor control lineup, the computing system analyzes organization data related to the organization associated with a user and other organizations with similar attributes, such as industry and geographic location. The organization data may be received via a web browser or retrieved from a database. The recommended motor control lineup is presented to the customer via a GUI (displayed in a native application or a web browser) in an elevation view where the user can modify the lineup as desired.

The single-line diagram may provide a visual representation of the motor control lineup and can be generated from the motor control lineup, as modified by the user. After the electrical load list is received, a graphics engine identifies each electrical component in the load list and generates a corresponding graphical object. As each graphical object is generated, the graphics engine updates the single-line diagram, which is concurrently rendered in the web browser. Advantageously, embodiments described herein provide a real-time rendering of the single-line diagram which is updated throughout a lifecycle of a project. Further, embodiments described herein improve an efficiency of generating a single-line diagram because individual graphical objects can be updated without having to manually revise the single-line diagram.

The techniques disclosed herein improves accuracy of the motor control lineup recommended to the user by integrating data into the analysis which may not be directly related to the customer. Further, techniques described herein reduce an amount of computing resources needed to generate the recommended motor control lineup. Embodiments described herein also provide a real-time rendering of the single-line diagram which is updated throughout a lifecycle of a project. Further, embodiments described herein improve an efficiency of generating a single-line diagram because individual graphical objects can be updated without having to manually revise the single-line diagram.

Advantageously, embodiments disclosed herein provide techniques to reduce a time required to design, re-design, and prepare an order for industrial device assemblies and a corresponding single-line diagram. Thus, the embodiments disclosed herein reduce project delays and provide a streamlined process for the design and ordering process of industrial device assemblies.

Generating Base Designs and Layouts for Each Electrical Load List and Corresponding Client Data As mentioned above, the motor control lineup is an example of a base design generated based on the electrical load list and client data (e.g., industry data, location data). The base design may be a list of electrical components designated in a hierarchical fashion, such that the electrical components (e.g., industrial equipment, network equipment), mechanical components, and the like are used in coordination with each other to perform industrial automation operations. While the motor control lineup may define the control devices for one or more motors of an electrical power system and a layout for the control devices, the base design in general may define attributes, model of electrical components (e.g., the control devices), type of electrical components, lead time (e.g., time between submitting a purchase order and completing production of the industrial device assembly), catalog numbers, costs, descriptions, names, related industries, and so forth associated with an industrial device assembly.

The embodiments herein provide techniques to streamline the process for generating base designs (e.g., motor control lineups), desired layouts, and diagrams (e.g., single-line diagram, elevation drawings, editable engineering drawings) by reducing an amount of customer input used to generate a suitable layout and a collection of devices to use. The desired layouts may include a desired position of each electrical component (e.g., control devices) within the physical industrial device assembly. For example, the industrial device assembly may be subdivided into lineups, sections, columns, units, modules, or the like. Each lineup may have 1-N sections and each section may have 1-M units, which respectively contain at least one industrial automation device or control device. For example, a desired layout for an example industrial device assembly may include 10 sections each with 20 units, thereby supporting a total of 200 units. The number of industrial automation devices that may be placed within each unit may be dependent on electrical load limits of respective sections and units. Positioning of the industrial automation devices within the physical industrial device assembly may be limited based on physical dimensions of sections and units within the industrial device assembly, electrical connectivity, and other electrical load limits. For example, with respect to electrical connectivity, if a unit includes 1 electrical port that can connect to 5 devices, the unit may include no more than 5 industrial automation devices.

As mentioned previously, in order to submit a purchase order to a manufacturer for a particular industrial device assembly, a customer may define numerous specifications and complete questions to generate base designs, layouts, and diagrams, which are used to submit the purchase order. Because defining each specification and selecting every desired preference manually involves detailed knowledge about the industrial device assembly and the manufacturer, customers without technical backgrounds or intimate knowledge of the industrial device assembly may not be able to efficiently define specifications. In some instances, the customer may not be aware of every available parameter or specification that is accepted or used by a manufacturer when producing the industrial device assembly. For example, a manufacturer may provide safety attributes (e.g., arc containment) when producing particular industrial device assemblies. A customer without technical background or without intimate knowledge of the manufacturer and the industrial device assembly may inadvertently neglect the opportunity to select parameters related to such safety attributes. Further, manually selecting each parameter or specification may be time-consuming, expensive, and inefficient.

Rather than having to complete numerous selections and questions to submit a purchase order, the embodiments described herein may allow customer may provide a certain number of inputs (e.g., 3 inputs, 5 inputs, 10 inputs), such that a system may generate an appropriate design and layout suitable for the customer's purposes. For example, the customer may submit an electrical load list, industry data, and location data as inputs to a graphical user interface (GUI) of a computing system. As discussed above, the location data may include a geographic location of the customer or an industrial site where the industrial device assembly will be installed, while the industry data may include an industry of the customer or the industrial device assembly. Based on such customer inputs, the computing system may determine numerous parameters (e.g., 100 parameters, 200 parameters) related to a number of levels of operations for various components of the industrial device assembly to generate customer-specific base designs. The parameters may include safety attributes (e.g., arc containment), intelligence attributes (e.g., processing power), system attributes (e.g., control voltage), communication attributes (e.g., available number of ports), unit attributes (e.g., withdrawable units), and the like related to the industrial device assembly.

The parameters may define one or more levels of operations for each of electrical component of the industrial device assembly based on the client data For example, the safety attributes may define a level of protection or an amount of protective features (e.g., voltage isolation, maximum current, clearance distances), protective mechanical feature (e.g., shield, type of wiring), or other design feature that may enhance safety attributes related to using the industrial device assembly or equipment within the industrial device assembly.

The intelligence attributes may include types of devices and/or controllers that may be used by one or more components of the industrial device assembly that may control the operations of the components or the industrial device assembly. That is, the intelligence attributes may detail the processing power or capabilities of respective components, the abilities of the respective components to autonomously perform certain processes or tasks, the capabilities for the respective components to send commands to other devices, and the like.

The communication attributes may include parameters or settings that describe the communication capabilities of the respective component or industrial device assembly. As such, the communication attributes may include a type of communication protocol that the respective component uses, a number of communication ports available for the respective component, or the like.

The unit attributes may include parameters that describe the physical dimensions (e.g., length, width, height, weight) of each of the respective components of the industrial device assembly. As mentioned above, the industrial device assembly may be subdivided into 1-N sections, and each section may have 1-M units, which respectively contain at least one electrical component or control device. Each section and corresponding unit may have electrical load limits and particular dimensions that help define the maximum size (e.g., length, width, and height) and maximum weight of each of the respective components disposed within each section and corresponding unit.

Using a machine-based processing and algorithms and a database of historical data related to client information, client preferences, and previous industrial device assemblies, the computing system may identify the parameters and subsequently identify a set of base designs and corresponding supporting modules based on the identified parameters. For example, supporting modules and the base design may be identified based on customer preferences such as for a particular type of drive product. That is, the particular type of drive product may dictate a selection of a particular base design. The supporting modules may include additional components that may not have been a part of the electrical load list but may be useful in enabling certain components to operate or allow the industrial device assembly to perform efficiently. The supporting modules may assist the operation of at least one the electrical components within the industrial device assembly or base design. For example, a supporting module may include a fan to a cool a unit within the industrial device assembly. While the fan does not control a motor of the industrial device assembly (e.g., MCC), the fan maintains a safe operating environment for the electrical components. Further, supporting modules may include mechanical stands that allow certain devices to have a certain amount of clearance from a floor, power supply modules that ensure that a sufficient amount of regulated voltage is provided to a component, and the like. Additional examples of the supporting modules may include main switches, Ethernet switches, power supplies, Ethernet power supplies. As used herein, main switches may refer to switching devices such as a primary circuit breaker that provides power to the entire industrial device assembly and downstream devices. As such, the main switches protect the MCC from over current faults and control providing power to the MCC. Using machine-learning algorithms or other suitable algorithms that account for the load list, geographic location of the client, and/or historical data associated with the client, the processor 126 may select a type and size of one or more main switches and corresponding power structures to support the entire MCC and other connected components. In turn, the computing system may display the set of base designs to the client.

After reviewing the set of base designs, the client may select a particular base design. By selecting the particular base design, the customer may bypass defining each parameter and completing numerous questions related to an industrial device assembly to submit a purchase order for a particular industrial device assembly. Based on the selected base design, the processor 126 may generate and display a layout, which is a graphical representation indicative of the positioning of each electrical component within the industrial device assembly.

Figure 8:
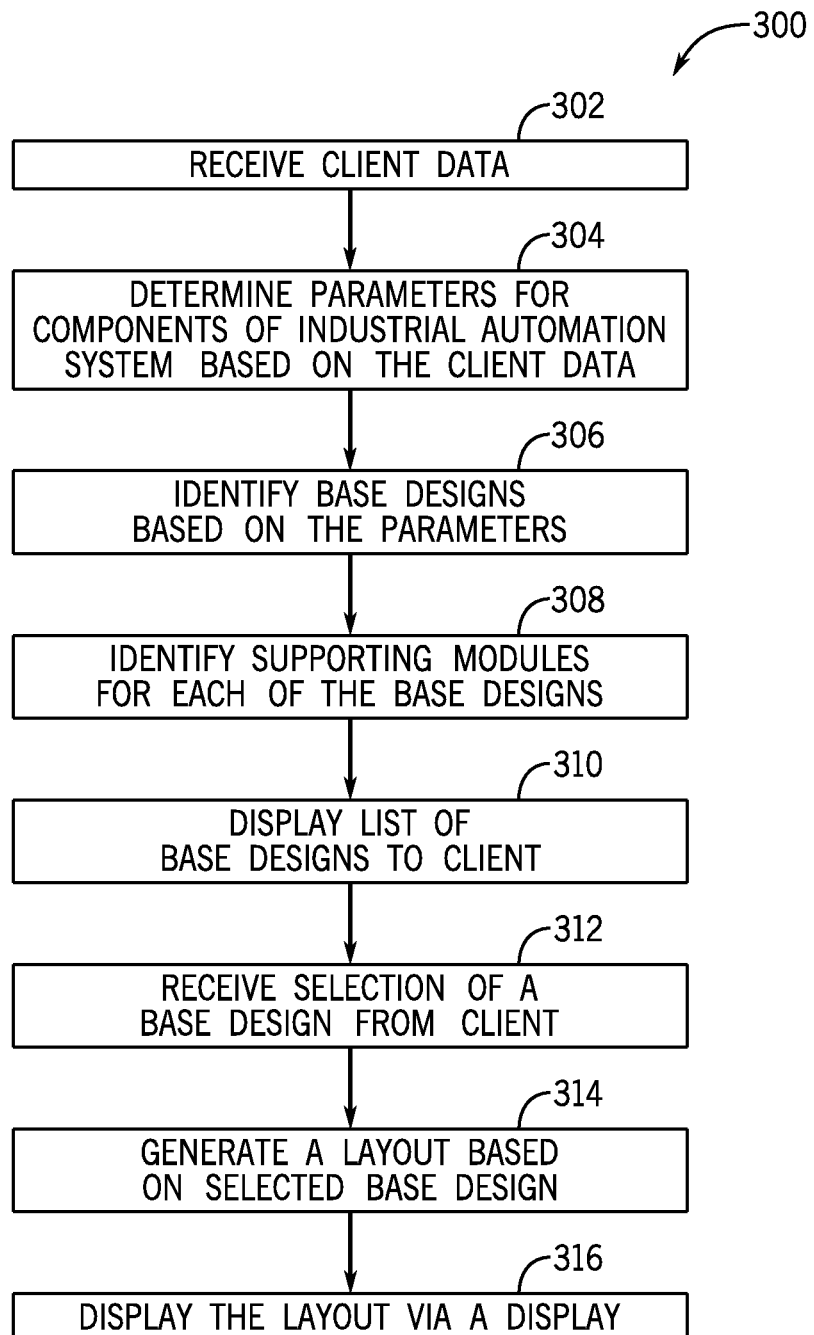
FIG. 8 illustrates a flow chart of a process for dynamically generating a set of base designs and supporting modules based on the client data of FIG. 3, according to one embodiment.

With the foregoing in mind, FIG. 8 is a flowchart of process 300 for dynamically generating base designs and corresponding supporting modules for a particular industrial system based on client data. As mentioned above, the base designs are generated using the electrical load list and client data (e.g., industry data, location data). Each base design may include a list of electrical components designated in a hierarchical fashion, such that the electrical components are used in coordination with each other to perform industrial automation operations. As such, the base design may provide a framework for different electrical components to physically and communicatively interconnect with each other. The process 300 may be performed by any suitable system that may receive client data via a GUI and instruct a processor to identify parameters to generate base designs and corresponding supporting modules. While the process 300 is described using steps in a specific sequence, it should be understood that the present disclosure contemplates that the described steps may be performed in different sequences than the sequence illustrated, and certain described steps may be skipped or not performed altogether. In some embodiments, the process 300 may be implemented by executing instructions stored in a tangible, non-transitory, computer-readable medium, such as the memory device 128, using a processor, such as the processor 126.

According to the process 300, the processor 126 receives client data from a user via the GUI (block 302). The client data may include an electrical load list (e.g., upload a spreadsheet indicative of the electrical load list via the GUI), a geographical location associated with the user or installing an industrial device assembly, and an industry related to the industrial device assembly. The client data may be specified by the user via the GUI or some other suitable input component. In some embodiments, the user may submit the electrical load list while the processor 126 may automatically determines the geographical location and the industry of the client based on historical data associated with the client related to previous industry device assemblies. Such historical data for each client and corresponding previous industry device assemblies may be stored in a database or a device library that is accessible by the processor. The database or device library may include information related to the client data, parameters, base designs, supporting modules, layouts, single-line drawings, elevation drawings, engineering proposal documents, and the like for each client for particular industry device assemblies.

The geographical location may also be determined based on sensor data indicative of the client's location, a location of an existing industrial system associated with the client, or the like. As such, the sensor may be any suitable location sensor, such as a global positioning sensor (GPS) or the like.

After determining the geographical location and the industry of the client, the processor 126 may display the determined geographical location and the industry to the client via the GUI. In turn, the user may verify or change the geographical location and the industry. Further, the user may be able to modify the electrical load list with one or more modified electrical components after submission of the client data and even after generation of the base designs. For example, after the base designs and corresponding modules have already been generated, the user may wish to change an electrical component identified based on the client data. Thus, the user may submit a modification to the electrical component or submit another electrical load list with the modification to the electrical component. The user may not have to re-submit each of the previous inputs as previously submitted inputs may be saved by the processor 126 and used to regenerate the base design and corresponding supporting modules based on the modification to the electrical component. As such, the process 300 may provide an efficient and convenient way for the user to dynamically modify inputs or add new inputs while generating a layout for the industrial system.

After the client data has been received, the processor 126 may determine additional parameters associated with electrical components of the industrial device assembly (block 304). In some cases, the user may select numerous parameters (e.g., 100 parameters, 200 parameters) or complete questions to generate base design and to submit a purchase order for the industrial device assembly. Having the processor 126 determine the parameters may be efficient by reducing the number of times the user is queried and the time for generating a client-specific base design and layout. The parameters may include safety attributes (e.g., arc containment), intelligence attributes (e.g., number of intelligent control devices), system attributes (e.g., control voltage, industrial operating voltage), communication attributes (e.g., number of power switches), unit attributes (e.g., withdrawable units), and the like related to the industrial device assembly.

The processor 126 may determine the parameters based on analyzing and identifying patterns of previously specified parameters from historical data associated with a particular client from previous industry device assemblies. The historical data may be retrieved from a database that stores information related to customer selections and preferences related to generating base designs over a period of time, for past purchases, based on machine-learned patterns or behaviors, and the like. The database may be continuously updated each time a base design is generated or after a particular period of time. For example, the historical data may include data related to base designs previously purchased by a client, and other related data, such as preferences for a layout of a base design. The historical data may include, for example, safety features, such as arc containment enclosures previously purchased by the customer. The historical data may also include particular layouts of base designs previously purchased by the customer or other organizations.

As such, the process 300 may involve determining client-specific parameters to more accurately and efficiently generate client-specific base designs. In some embodiments, the processor 126 may employ a machine-learning algorithm or an intelligent knowledge-based algorithm to analyze and identify patterns from the historical data. It can be appreciated that machine-based processing and algorithms may provide insight that may not be attained via human analyses, by relying on complex data patterns/relationships that may not be conceived in the human mind. Further, the processor 126 may take advantage of known patterns and interdependencies between parameters to calculate unknown parameters via the machine-based processing and algorithms.

For example, a machine learning model may be determined based on historical data related to various clients from various industries and geographic locations. The machine learning model may be updated each time a base design recommendation is determined, a base design is purchased/selected, or at some other time (e.g., after a set period of time has passed, after a set number of base designs have been generated). The machine learning model may be updated such that subsequent base designs take the most recent customer data into account.

In some embodiments, the machine learning model may also analyze how various users interact with generated set of base designs. For example, the generated set of base designs may be presented to a user via a web browser executing on a client device. The machine learning model may monitor how the user or client interacts with the generated set of base designs in the web browser to analyze any changes or selections that are made and use these inputs as feedback for further training of the machine learning model. Monitoring and adding these interactions to the machine learning model may enable the machine learning model to continually improve its ability to provide recommendations to users and to other organizations that share certain similarities with the respective organization.

Based on the client data (e.g., location data, and industry data) as well as patterns determined from the historical data, the processor 126 may identify parameters for the electrical components from the electrical load list. The processor 126 may determine the type of parameters and acceptable limits corresponding to quantitative parameters (e.g., range for industrial operating voltage) for the electrical components based on identifying a function corresponding to each electrical component such that the electrical components may work together in the industrial automation system. That is, as base designs are generated for each area where there could be an option, the processor 126 may designate one of the options as a base option and may designate the other selections as additional options. For instance, the processor 126 may declare that a machine interface with a unit may include a pushbutton as a base option and may include a Human Interface Machine (HIM) as a selectable option.

Additionally, the processor 126 may select parameters based on user history, geographic data, industry data, and the like. For example, the processor 126 may identify an industrial operating voltage for a particular base design based on knowledge of predetermined or common industrial voltages used across the world and a corresponding location of a user (e.g., client) or the particular industrial device assembly. In addition to identifying the type of parameters and corresponding operating ranges based on particular functions of each of the electrical components, the processor 126 may also identify parameters using the historical data based on client preference from previous selections and purchases.

After identifying the parameters, the processor 126 may identify a set of base designs that meets the identified parameters (block 306). As mentioned above, the database or the design library may store any number of base designs corresponding to different clients. From the available base design and information in the database or the design library, the processor 126 may select a set of base designs that are well-suited and meet specifications of the client data and the identified parameters. That is, the identified set of base designs are client-specific or meet client specifications and preferences.

Parameters are used to select particular base designs based on client, geographic, and industry information as well as electrical load lists. For example, based on size and type of components (e.g., starter, drive, soft start) that meet control specifications (e.g., output voltage) of a particular region and/or industry, a set of base designs are selected. For example, a particular selection of an overload for a motor start may correspond to a particular selection of base designs.

The processor 126 may use the previously mentioned machine learning algorithm to select the set of base designs. For example, the processor 126 may employ decision tree logic to determine the set of base designs from the base designs in the database or the design library that likely match the client data and the identified parameters. That is, the processor 126 uses the decision tree logic to filter out base designs that do not meet specifications of the client data and the identified parameters. For example, a decision tree may provide respective probabilities for each base design meeting the specifications of the client data and the identified parameters. If the probability of the base design is greater than a threshold percentage (e.g. 75%, 85%, 95%), then the processor 126 may select the base design to be a part of the set of base design that are client-specific.

In some embodiments, the processor 126 may also analyze electrical load limits to identify the set of base designs. The number of electric components that may be placed within each unit may be dependent on electrical load limits of respective sections and units. Positioning of the electric components within the physical industrial device assembly may be limited based on physical dimensions of sections and units within the industrial device assembly, electrical connectivity, and other electrical load limits. For example, with respect to physical dimensions, if a desired industrial device assembly includes 10 sections each with 20 units, the industrial device assembly may support a maximum total of 200 units. Further, with respect to electrical connectivity, if a unit includes 1 electrical port that can connect to 5 devices, the unit may include no more than 5 industrial automation devices.

After the set of base designs have been identified, the processor 126 may identify one or more supporting modules for each base design of the identified set of base designs (block 308). The supporting modules may include additional components that may not have been a part of the electrical load list but may be useful in enabling certain components to operate or allow the industrial device assembly to perform efficiently. For example, supporting modules may include mechanical stands that allow certain devices to have a certain amount of clearance from a floor, power supply modules that ensure that a sufficient amount of regulated voltage is provided to a component, and the like. Additional examples of the supporting modules may include one or more main switches, one or more Ethernet switches, one or more power supplies, one or more Ethernet power supplies.

Some supporting modules may provide additional communication features between the respective components. The quantity and location of the supporting modules within the industrial device assembly may be determined based on the electrical load limits. The processor 126 may identify the supporting modules based on determining particular functions of each of the electrical components and using the historical data based on client preference from previous selections and purchases.

With the foregoing in mind, by way of example, the processor 126 may determine an appropriate motor management approach (e.g., use of starter, drive, soft start), appropriate sizes of components that may be used to meet the control and output voltage based on a region, an industry, or other input parameters that correspond to a particular base design. For instance, the processor 126 may make a selection regarding a type of overload that may be used for a particular motor starter. The selected overload may cause the processor 126 to change the corresponding base design selection. In this way, the algorithm for selecting components and base designs may use customer history, geographic location, industry and application information, and other input parameters to select the correct overload, which then may be used to select the proper motor starter base design.

Having identified the parameters, the set of base designs, and the supporting modules, the processor 126 may then display the set of base design and corresponding supporting modules to the client via the GUI (block 310). Each base design may be represented as one or more selectable visualizations (e.g., images). In some embodiments, each base design may be represented as a thumbnail on the GUI. Further, each base design includes data related to the parameters, a model of each of the electrical components, a lineup of the electrical components, a lead time, a catalog number, a cost, a description, a name, a related industry, and other information for the industrial device assembly.

After viewing the set of the base designs displayed via the GUI, the user may select a visualization associated with a particular base design. That is, the processor 126 may receive a selection of a base design as input from the client (block 312). Based on the selected base design, the processor 126 may dynamically generate a layout associated with the base design (block 314).

In some embodiments, the layout may be an overview, a horizontal view, a vertical view of the placement of the electrical components within the industrial device assembly and corresponding electrical connections and communication links between the electrical components. In particular, the layout may be a graphical representation of the positioning of each electrical component within the physical industrial device assembly based on the selected base design. In some embodiments, the layout may include, a single-line view, and an elevation view of the electrical components. The processor 126 may dynamically display the layout to the user via the GUI (block 316) with the selection of the base design. In additional and/or alternative embodiments, the processor 126 may receive input from the user to generate a particular layout.

Figure 9:
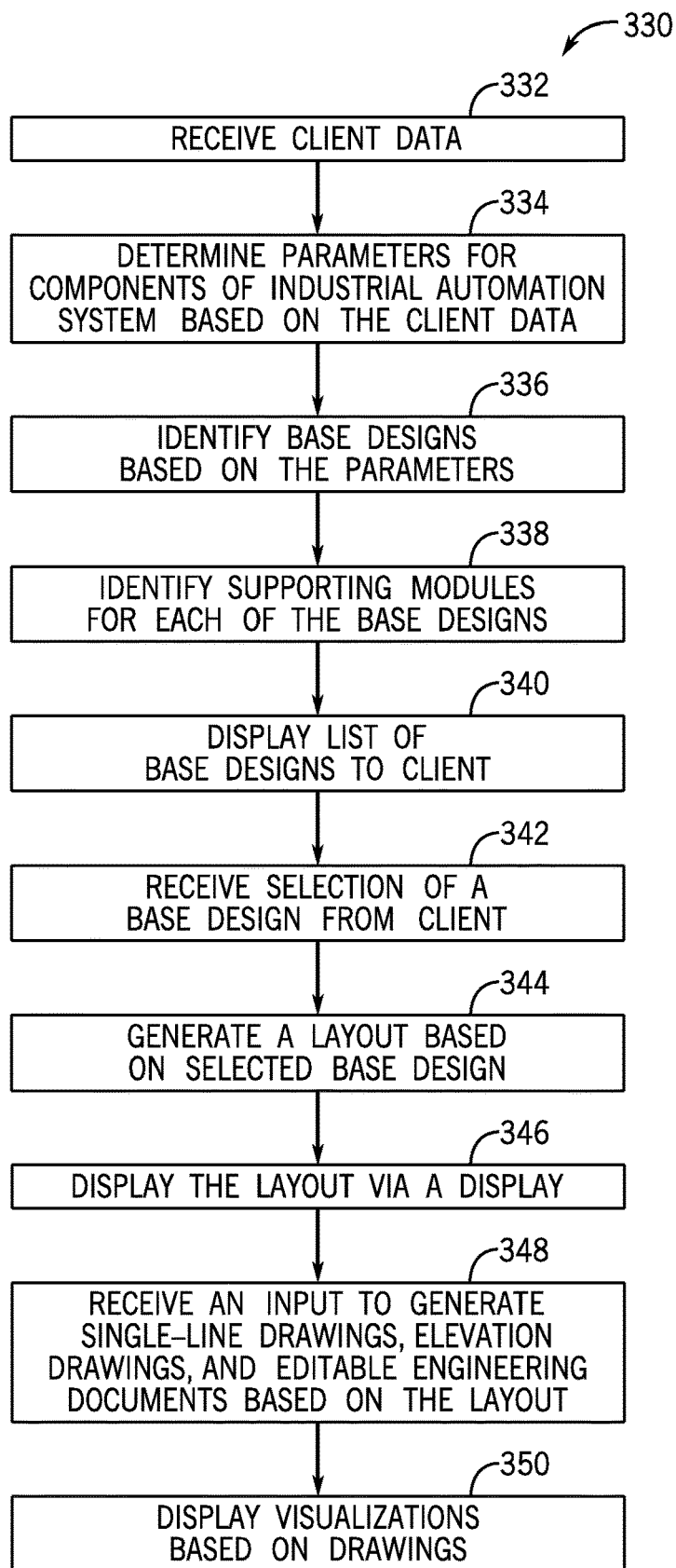
FIG. 9 illustrates a flow chart of a process for dynamically generating single-line drawings, elevation drawings, and engineering documents based on a selected base design from the set of base designs generated according to the process of FIG. 8, according to one embodiment.

With the preceding in mind, FIG. 9 illustrates a flow chart of a process 330 for dynamically generating single-line drawings, elevation drawings, and engineering documents based on the base design selected by the user. The process 330 may be performed by any suitable system that may receive input via a GUI and instruct a processor to generate and display single-line drawings, elevation drawings, and engineering documents based on the base design selected by the user. While the process 300 is described using steps in a specific sequence, it should be understood that the present disclosure contemplates that the described steps may be performed in different sequences than the sequence illustrated, and certain described steps may be skipped or not performed altogether. In some embodiments, the process 300 may be implemented by executing instructions stored in a tangible, non-transitory, computer-readable medium, such as the memory device 128, using a processor, such as the processor 126.

Blocks 302 to 316 from FIG. 8 correspond in description with blocks 332 to 346 in FIG. 9, respectively. After the layout based on the base design has been generated, the user may also have the option to view a single-line drawing, an engineering drawing, and/or an engineering proposal document via the GUI. As such, according to block 348, the processor 126 may receive user input via the GUI to generate the single-line drawing, the engineering drawing, and/or the engineering proposal document. As mentioned above in FIG. 1, the single-line drawing single-line diagram may be a visual representation of the industrial device assembly. The industrial device assembly be complex and the single-line drawing provides a simplified visual representation of the industrial device assembly in two-dimensions. To generate the single-line diagram, a single-line engine may generate a graphical object for each of the electrical components in the industrial device assembly. The graphical objects may be generated using scalable vector graphics.

Like the single-line drawing, the elevation drawing is simplified visual representation of the industrial device assembly in two-dimensions, but the elevation drawing depicts dimensions such as height, length, and width of the industrial device assembly and corresponding electrical components. Further, the engineering proposal document may include a detailed description of the base design and the identified parameters. In some embodiments, the engineering proposal document may include aggregate base design information (e.g., the detailed description of the base design and the identified parameters, the single-line drawing, the elevation drawing, the layout). In response to receiving user input, the processor 126 may display one or more visualizations that represent the single-line drawing, the elevation drawing, and/or the engineering proposal document (block 350).

Visual and textual representation within the single-line drawing, the elevation drawing, and/or the engineering proposal document may be linked to each other or configured as interactive objects that cause the processor 126 to provide additional information regarding the object that corresponds to the visual and/or textual representation. That is, a graphical object representing an electrical component in the single-line drawing may be linked to or used to access a visualization representing the electrical component in the elevation drawing. As such, the visual and/or textual representations may include metadata or may be associated with a software pointer that links the respective representation to other objects in one medium to corresponding objects other mediums. In addition, the graphical object of the single-line drawing and the visualization of the elevation drawing may correspond to a description of the electrical component in the engineering proposal document. In some embodiments, the user may search for information related to a particular electrical component via the GUI. The processor 126 may identify representations of the particular electrical components and highlight those representations in the layout, the single-line drawing, the elevation drawing, the engineering proposal document, and the like in the search result that is presented to the user.

Further, because features of the layout, the single-line drawing, the elevation drawing, the engineering proposal document are linked to each other, the processor 126 may dynamically update any of the features represented on each document or drawings in an efficient manner. For example, if the processor 126 receives an input of modification to an electrical component from the electrical load list, the processor 126 may update the electrical component within the base design, the layout, the single-line drawing, the elevation drawing, the engineering proposal document, and the like without independently changing inputs for each respective document. Furthermore, a change to an electrical component within the layout, the single-line drawing, the elevation drawing, the engineering proposal document also be automatically applied to other visualizations. For example, a change to an electrical component within the layout is automatically reflected as a similar change to the electrical component in the single-line drawing, the elevation drawing, and the engineering proposal document. This change or update can be seen by the user in response to the processor 126 receiving an input for generating the single-line drawing, the elevation drawing, and/or the engineering proposal document.

Figure 10:
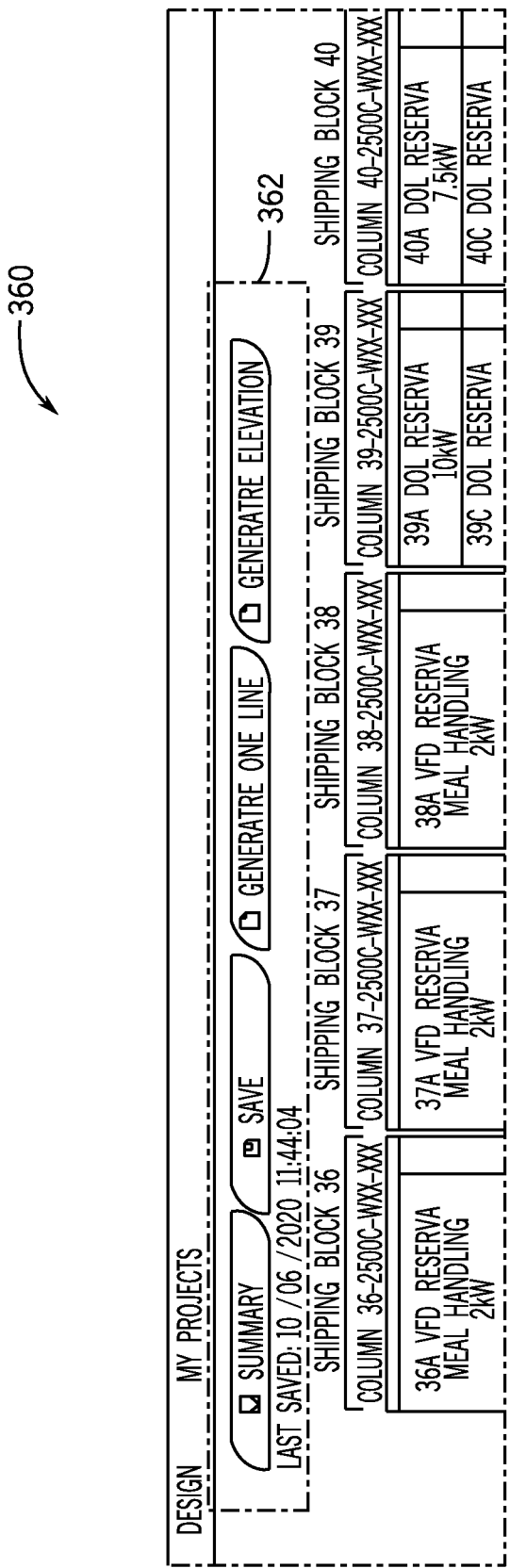
FIG. 10 illustrates a graphical user interface for generating the single-line drawings, the elevation drawings, and the engineering documents of FIG. 9, according to one embodiment.

The widgets depicted on the GUI may provide interactive input components that the user may select to generate the single-line drawing, the elevation drawing, and/or the engineering proposal document. As such, FIG. 10 illustrates GUI 360 that displays the options for generating the single-line drawing, the elevation drawing, and/or the engineering proposal document. For example, the GUI 360 may include a set of widgets 362. Selecting a respective widget from the set of widgets 362 may result in generating a summary of information related to the base design, saving information displayed on the GUI 360, generating the single-line drawing, generating the elevation drawing, generating the engineering proposal, and the like. In some embodiments, the single-line drawing, the elevation drawing, and/or the engineering proposal documents may be exported as PDFs or any suitable file type by the user.

Figure 11:
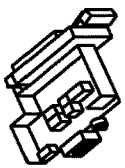
FIG. 11 illustrates a graphical user interface that depicts information related to the selected base design of FIG. 9, according to one embodiment.

FIG. 11 illustrates a GUI 390 that depicts information related to the selected base design. The panel 396 depicts a brief lineup summary of the industrial device assembly while the panel 394 depicts a brief description of each electrical component within the industrial device assembly. The panel 396 includes a total cost of the industrial device assembly, while the panel 394 may include an individual cost of each electrical component or unit within the industrial device assembly (not shown in FIG. 11). In some embodiments, the panel 396 may depict information for each unit, and the panel 396 may be organized, such that similar units of the industrial device assembly have been grouped together. Selecting a button from the set of buttons 392 corresponds to various actions. For example, selecting the "request engineering packet" allows the user to download a file containing a title page, the single-line drawing, the elevation drawing, and other schematics associated with the selected base design or lineup. Selecting the "request draft proposal" allows the user to download a file containing a brief summary of the base design and information related to the purchasing process of the manufacturer. Further, selecting the "request quote" allows the user to send the manufacturer a request for receiving a fixed price proposal.

As mentioned above, the database or the design library may store any number of base designs corresponding to different clients (e.g., 1000 base designs). From the available base design and information in the database or the design library, the processor 126 may select a set of base designs that are well-suited and meet specifications of particular client and the identified parameter. That is, the identified set of base designs are client-specific or meet client specifications and preferences. However, if the processor is unable to identify or generate client-specific set of base designs, then the processor 126 may provide the user with predefined set of base designs.

Figure 12:
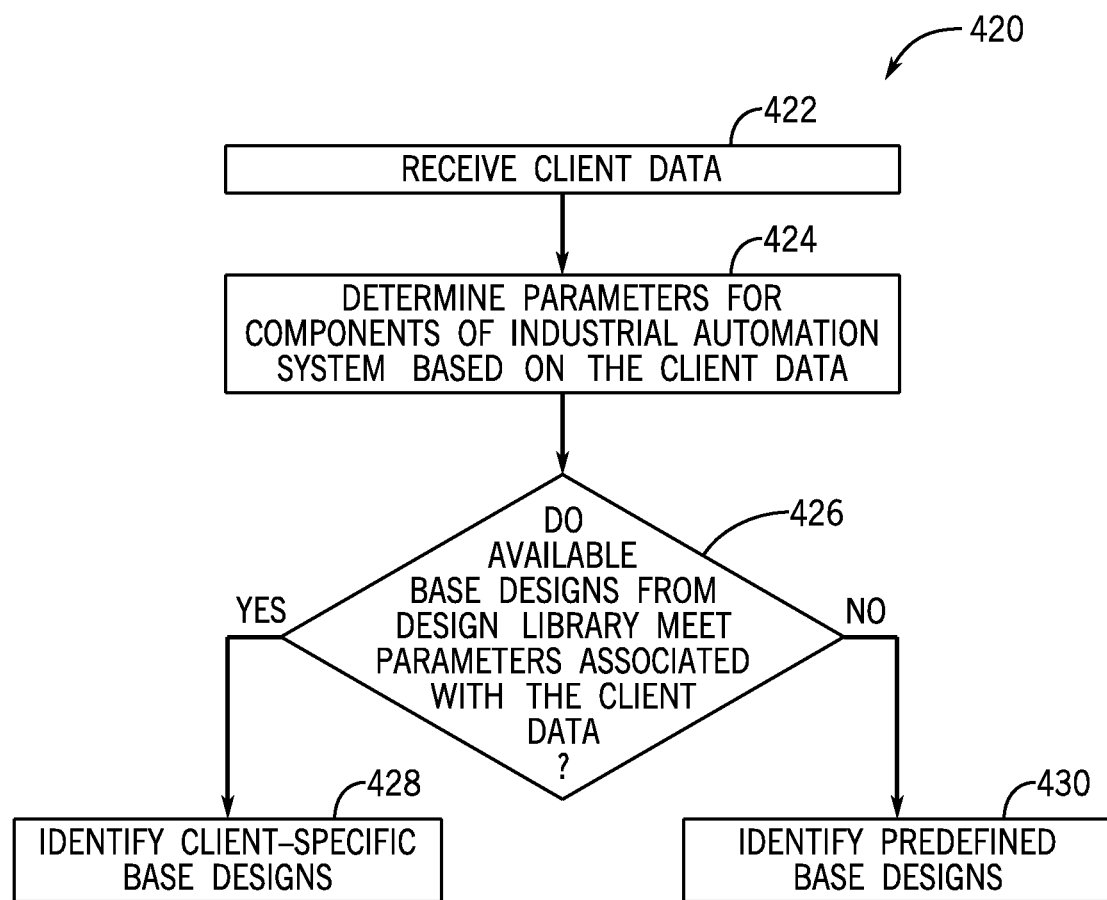
FIG. 12 illustrates a flow chart of a process for providing predefined base designs in response to the inability to generate the set of base designs of FIG. 8 based on the client data, according to one embodiment.

FIG. 12 illustrates a flow chart of a process 420 for providing predefined base designs, according to one embodiment. The process 420 may be performed by any suitable system that may instruct a processor to provide predefined base designs via a GUI. While the process 420 is described using steps in a specific sequence, it should be understood that the present disclosure contemplates that the described steps may be performed in different sequences than the sequence illustrated, and certain described steps may be skipped or not performed altogether. In some embodiments, the process 420 may be implemented by executing instructions stored in a tangible, non-transitory, computer-readable medium, such as the memory device 128, using a processor, such as the processor 126.

Blocks 302 and 304 from FIG. 8 correspond in description with blocks 422 and 424 in FIG. 12, respectively. After determining the parameters in block 424, the processor 126 may determine whether any of the available base designs meet any of the parameters based on the client data (block 426). That is, the processor 126 may query the design library to identify existing base designs that correspond to the parameters determined at block 424. If the processor 126 is able to find a set of base designs that has more than a threshold percentage of the parameters (e.g., threshold percentage such as 75%, 85%, or 95%), then the processor 126 may identify and provide the user with client-specific base designs (block 428). These client-specific base designs are similar to the set of base design identified in block 306 of FIG. 8. However, if the processor 126 is unable to find a set of base designs that meets the parameters, then the processor

126 may identify and provide the user with predefined base designs (block 430) to manage the industrial device assembly (e.g., MCC).

Predefined based designs may be generated based on available base design from previous industrial device assemblies associated with other clients, industries, or the like and/or based on technical knowledge of sales and engineering staff. Predefined base designs may correspond to an expected set of electrical components that would be included for starting and/or managing motor operations. As such, by way of example, the base designs may include a core starter, a drive or a soft starter, and a number of components used to support those components (e.g., breakers, overload relay, cooling, etc.). As such, the predefined base design may be defined by a load type and size and may be further refined by core components that affect components of a corresponding electrical designs (e.g., voltage, maximum current) and mechanical designs (e.g., dimensions). As such, base design may also include electrical and mechanical engineering documentation that detail the electrical design and the mechanical design aspects of the industrial equipment assembly.

Keeping this in mind, if the processor 126 is unable to identify base designs from the database or the design library for a particular client or generate a set of base designs for the particular client, then the processor 126 may select a predefined base design that is similar in industry, location, or other features related to the particular client. The features may include the type of product being produced by the client, a type of process being performed by the client, a set of regulations associated with the client, and the like. While the predefined base design may not be fully representative of the identified parameters like a client-specific base design, the predefined base design may be partially representative of the identified parameters particular to the client. For example, given the particular client is form the oil and gas industry, the processor 126 may provide predefined base designs related to the oil and gas industry. In this way, a user may then customize the predefined base design to accommodate its particular functions.

As briefly discussed above, after the processor 126 identifies the set of base designs, the processor 126 may also add any supporting modules to the set of base design. Non-limiting examples of the supporting modules may include one or more main switches, one or more Ethernet switches, one or more main power supplies, one or more Ethernet power supplies. In some embodiments, rather than adding the supporting modules to each base design with the set of base design, the processor 126 may automatically add any supporting modules (e.g., Ethernet module) to the selected base design.

Generating Ethernet Power Modules for Selected Base Designs

Figure 13:
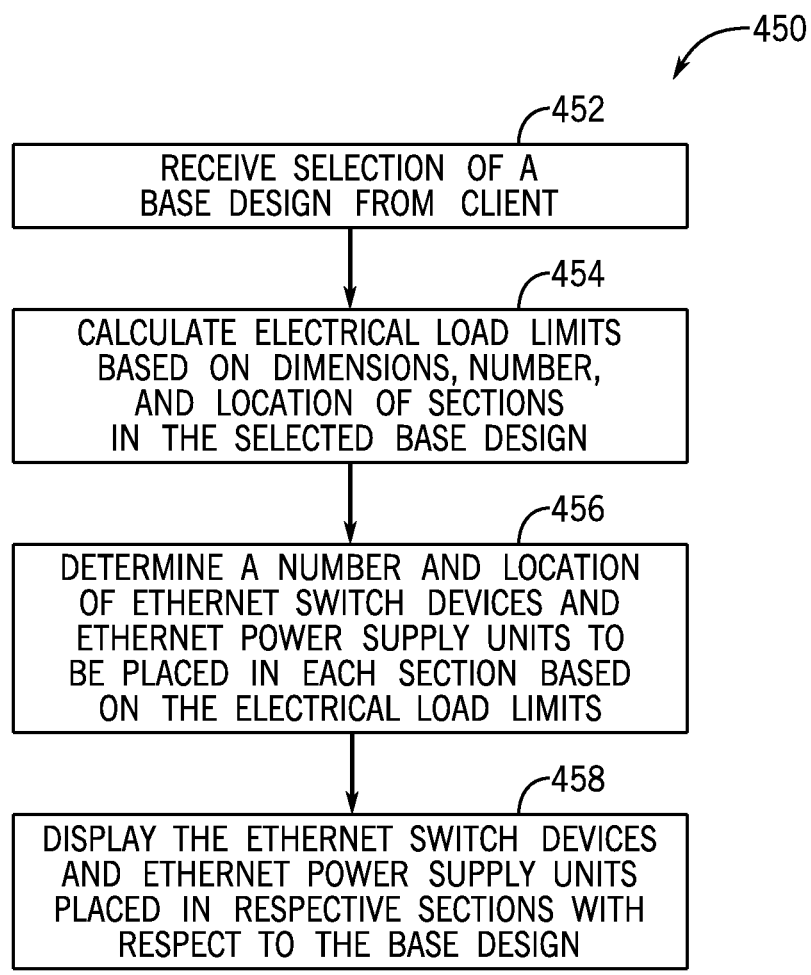
FIG. 13 illustrates a flow chart of a process for identifying Ethernet power modules to incorporate into the selected base design of FIG. 9, according to one embodiment.

As such, FIG. 13 illustrates a flow chart of a process 450 for generating Ethernet power modules based on the selected base design, according to one embodiment. The process 450 may be performed by any suitable system that may instruct a processor to determine a quantity and location of Ethernet modules to be placed within the layout. While the process 450 is described using steps in a specific sequence, it should be understood that the present disclosure contemplates that the described steps may be performed in different sequences than the sequence illustrated, and certain described steps may be skipped or not performed altogether. In some embodiments, the process 450 may be implemented by executing instructions stored in a tangible, non-transitory, computer-readable medium, such as the memory device 128, using a processor, such as the processor 126.

Block 302 from FIG. 8 corresponds in description with block 452 in FIG. 12. After receiving the selected base design, the processor 126 may calculate the electrical load limits based on physical dimensions (e.g., length, width, height), number, and location of sections and units in the selected base design (block 454). As mentioned above, the industrial device assembly may be subdivided into lineups, sections, columns, units, modules, or the like. Each lineup may have 1-N sections and each section may have 1-M units, which respectively contain at least one industrial automation device or control device.

The number of Ethernet switch devices and Ethernet power supply units that may be placed within each unit may be dependent on electrical load limits of respective sections and units. That is, the components or control devices (e.g., units) positioned in a particular section may be communicatively coupled to one or more Ethernet switch devices, which may include one more Ethernet switch power supply units. Based on the number of components in the section, the processor 126 may determine a number of Ethernet switch devices that may be used to facilitate connectivity to each of the components. That is, since each Ethernet switch device may include a limited number of ports, the number of Ethernet switch devices may relate to the number of components that are to be connected to the devices. In turn, based on the electrical load limits and the number of Ethernet switch devices determined by the processor 126, the processor 126 may determine a number of Ethernet switch power supplies that will be used to power the Ethernet switch devices. In some embodiments, different Ethernet switch power supplies may be rated for different power wattages and voltages, such that a limited number of Ethernet switch devices may be coupled to each Ethernet switch power supply. The processor 126 may account for these power characteristics when determining a number of Ethernet power supplies to use for the number of Ethernet switch devices.

In addition, the processor 126 may use the layout of the section in which the Ethernet switch devices and the Ethernet switch power supplies and the dimensions of the same to determine a number of the Ethernet switch devices and Ethernet switch power supplies to use to provide connectivity to the components in the respective section. That is, positioning of the Ethernet switch devices and Ethernet power supply units within the physical industrial device assembly may be limited based on physical dimensions of sections and units within the industrial device assembly, electrical connectivity, and other electrical load limits. For example, with respect to physical dimensions, if a desired industrial device assembly includes 10 sections each with 20 units, the industrial device assembly may support at most a total of 200 units. Further, with respect to electrical connectivity, if a unit includes 1 Ethernet port that can connect to 5 Ethernet devices, the unit may include no more than 5 Ethernet switch devices.

Based on the calculated electrical load limits and other factors discussed above, the processor 126 may determine the number and location of the Ethernet switch devices and Ethernet power supply units to be placed in each section and unit of the physical industrial device assembly (block 456). The processor 126 may also take into consideration which electrical components are Ethernet-enables when determining the number and location of the Ethernet switch devices and Ethernet power supply units for placement within each unit of a section.

In turn, the processor 126 may display the Ethernet switch devices and Ethernet power supply units placed in respective sections and units with respect to the selected base design on a layout (block 458). As mentioned above, the layout is a graphical representation of the positioning of each electrical component within the physical industrial device assembly based on the selected base design. In some embodiments, the layout may also include single-line drawings and elevation drawings.

If the processor 126 identifies a modification to an Ethernet switch device or Ethernet power supply, the processor 126 may update the base design, the layout, the single-line drawing, the elevation drawing, the engineering proposal document, and the like to reflect the modification. Furthermore, a change to an Ethernet switch device or an Ethernet power device in one graphical representation may also automatically applied to other visualizations. For example, a change to an Ethernet switch device within the single-line drawing may be automatically reflected as a similar change to the Ethernet switch device in the elevation drawing. This change or update can be seen by the user in response to the processor 126 receiving an input for generating the single-line drawing and/or the elevation drawing.

Generating Selectable Visualizations for Base Designs

Figure 14:
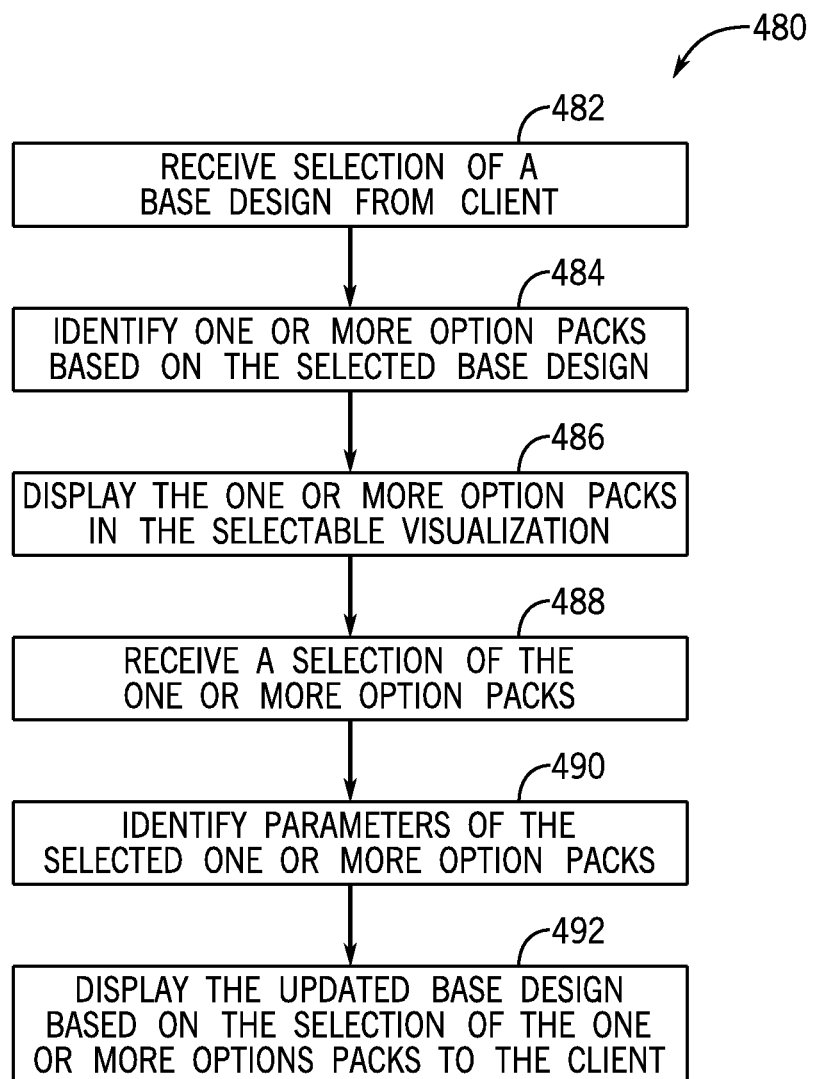
FIG. 14 illustrates a flow chart of a process for generating option packs associated with the selected base design of FIG. 9, according to one embodiment.

In some embodiments, the processor 126 may present selectable base designs and other options via a guided selling technique in a user-friendly and efficient manner. Option packs represent additional selectable functional groups associated with each base design. The option packs may be grouped based on particular parameters (e.g., safety attributes, system attributes, intelligence attributes, unit attributes) for each base design. As such, FIG. 14 illustrates a flow chart of a process 480 for generating option packs associated with the selected base design, according to one embodiment.

The process 480 may be performed by any suitable system that may instruct a processor to determine option packs associated with selected base design. While the process 480 is described using steps in a specific sequence, it should be understood that the present disclosure contemplates that the described steps may be performed in different sequences than the sequence illustrated, and certain described steps may be skipped or not performed altogether. In some embodiments, the process 480 may be implemented by executing instructions stored in a tangible, non-transitory, computer-readable medium, such as the memory device 128, using a processor, such as the processor 126.

Block 302 from FIG. 8 corresponds in description with block 482 in FIG. 12. After receiving the selected base design, the processor 126 may identify one or more option packs for the selected base design (block 484). The processor 126 may identify the one or more option packs based on client data (e.g., electrical load list, industry data, location data). An option pack may include a set of additional attributes or components (e.g., push button, HMI, actuator, operator station) related to the selected base design that are categorized based on similar functionalities. By way of example, an operator station, arc fault containment safety features, and communication options may be added to the selected base design as option packs. In any case, option packs allow for changes to the base design without impacting core electrical and mechanical designs of the base design. Further, option packs provide functional value to customers and sales staff associated with the industrial device assembly by grouping together components based on similar attributes, as opposed to using part number inputs. These additional, optional attributes may be categorized based on safety, system, intelligence, unit, and so forth. The safety option pack may include attributes such as arc containment, types of emergency equipment, and so forth. The intelligence option pack may include, for example, types of intelligent control devices. The system option pack may include attributes such as an industrial operating voltage, a control voltage, a line voltage, a line frequency, a type of line cable entry, types of buses, withstand rating, main current capacity, type of enclosure, percentage of load utilization, a location for load cable exit, a future unit space, and the like. The unit option pack may include attributes related to the size and weight of each electrical component.

The option packs available to a user may vary based on the selected base design and client data. For example, if the industry data indicates that the client (e.g., user) is from the oil and gas industry, the processor 126 may identify the one or more option packs related to the safety attributes. That is, if the industry guards itself from exceeding certain temperatures for various components in oil and gas manufacturing plants, the processor 126 may determine one or more safety option packs to add to the base design in order to address these potential situations.

After identifying the one or more options packs (e.g., safety option pack, communication option pack, intelligence option pack), the processor 126 may display the one or more option packs as one or more selectable visualization (block 486). Each option pack may correspond to a selectable visualization. In some embodiments, the selectable visualization may be a widget with a sliding feature (e.g., sliding widget). The sliding widget may include any number and types of levels. By way of example, the sliding widget may include 3 different levels (e.g. wide or broad level, intermediate level, advanced or narrow level) associated with varying degrees of features associated with the electrical components. At block 486, the processor may have identified and subsequently displayed a level corresponding with each option pack.

In some embodiments, the processor 126 may determine a level for each option pack based on historical data associated with the client from previous industry device assemblies. Such historical data for each client and corresponding previous industry device assemblies may be stored in a database or a device library that is accessible by the processor 126. The database or device library may include information related to the client data, identified parameters associated with the selected base design, supporting modules, layouts, single-line drawings, elevation drawings, engineering proposal documents, and the like for each client for each industry device assembly. Further, the processor 126 may employ a machine-learning algorithm or an intelligent knowledge-based algorithm to analyze and identify patterns from the historical data to determine the level for each option pack.

The levels of the sliding widget may be configured to slide bidirectionally by the user. That is, by moving the sliding widget in one direction, the levels may relatively increase or decrease in granularity. The levels tend to increase in granularity as the sliding widget slides from the left end of the sliding bar to the right end of the sliding bar. For example, the left end of the bar may correspond to a broad or wide level while the right end corresponds to an advanced or narrow level. In response to the user selecting a broad or wide level in an options pack, the processor 126 may identify overarching parameters for multiple components within the industrial device assembly. That is, the processor 126 may define a minimum number of parameters (e.g., 3, 5, 7 parameters) for each component of the multiple components within the industrial device assembly. Further, in response to the user selecting a narrow or advanced level in an options pack, the processor 126 may identify particular parameters for an individual component within the industrial device assembly. That is, the processor 126 may define a maximum number of parameters (e.g., 10, 20, 50 parameters) for the individual component. For example, the with respect to the narrow or advanced level, the processor 126 may identify every particular parameter of a software module used to control operating conditions of a single component within the industrial device assembly. The middle portion of the bar may correspond to an intermediary level. After viewing the one or more option packs and corresponding levels, which were automatically determined by the processor, on the GUI, the user may like to change a level associated with an option cap. In general, an options pack associated with an advanced, narrow level may be more expensive compared to options packs with a broad or wide level. Therefore, given that the identified parameters of the selected base design and corresponding supporting modules remain constant, a client may save money by selecting an option pack with a wider level compared to a narrower level.

Based on the one or more option packs presented to the user, the user may select particular option pack and change corresponding levels. It can be appreciated that a selectable visualization such as the sliding widget may be a user-friendly mechanism to receive inputs from the user regarding the one or more option packs. The sliding widgets reduces the number of inputs submitted by the user. Rather than the user having to complete numerous questions or defining each specification, the processor 126 may identify parameters for the one or more option packs based on limited number of inputs from the user.

In response to receiving a selection of the one or more option packs via user input (block 488), the processor 126 may identify parameters associated with the selected one or more option packs (block 490). As mentioned above, the parameters may include safety attributes (e.g., arc containment), intelligence attributes (e.g., type of intelligent control devices), system attributes (e.g., industrial operating voltage), unit attributes (e.g., withdrawable units), and the like related to the industrial device assembly. The processor 126 may identify parameters for the selected base designs based on determining the function of each of the electrical components in the selected base design, overall function of the industrial device assembly, and electrical load limits of respective sections and units. The identified parameters correlate with each base design and corresponding option packs. Based on the industry and regions of operating the industrial device assembly, the processor 126 may identify one or more safety option packs. For example, if the industry guards itself from exceeding certain temperatures for various components in oil and gas manufacturing plants, the processor 126 may determine one or more safety option packs (e.g., arc containment) to add to the base design in order to address these potential situations Further, based on patterns from prior historical data and the electrical load limits of respective sections and units, the processor may determine system and unit option packs. For example, based on the number of electrical components and corresponding electrical connections and operating ranges, the processor 126 may determine system and unit parameters. For example, given minimum and maximum operating and physical dimension limits of the industrial device assembly, the processor 126 may identify, for example, industrial operating voltage, a control voltage, a line voltage, and size of electrical components within the industrial device assembly. By way of example, with respect to the unit options pack and based on the number of electrical components in each unit, the processor 126 may determine a number of available electrical ports that may be used to facilitate connectivity to each of the electrical components. The processor 126 may determine intelligence option packs based on determining the type of electrical components within the industrial device assembly and function of the industrial device assembly. For example, the processor 126 may determine the type of intelligent control devices to include in an intelligence option pack in order to improve operating efficiency of the industrial device assembly and corresponding electrical components.

As mentioned above, in some embodiments, the processor 126 may determine the parameters based on analyzing each level corresponding to an option pack and identifying patterns from historical data associated with a particular client purchases, preferences from previous industry device assemblies, and/or technical knowledge of sales and engineering staff associated with the industrial device assemblies. In some embodiments, the processor 126 may employ a machine-learning algorithm or an intelligent knowledge-based algorithm to analyze and identify patterns from the historical data. It can be appreciated that machine-based processing and algorithms may provide insight that may not be attained via human analyses, by relying on complex data patterns/relationships that may not be conceived in the human mind. Further, the processor 126 may take advantage of known patterns and interdependencies between parameters to calculate unknown parameters via the machine-based processing and algorithms.

After identifying the parameters, the processor 126 may update the selected base design based on the selected one or more option packs. In turn, the processor 126 may display the updated base design based on the selection of the one or more options packs to the client via the GUI (block 492). The updated base design and corresponding option packs may be represented in a layout, a single-line diagram, an elevation drawing, an engineering proposal document, and the like. In some embodiments, the user may able to update selections of the one or more option packs and corresponding parameters, even after the updated base design with the one or more option packs has been generated. For example, in response to receiving a modification to a parameter associated with an option pack, the processor 126 may automatically update the option pack and corresponding base design.

Figure 15:
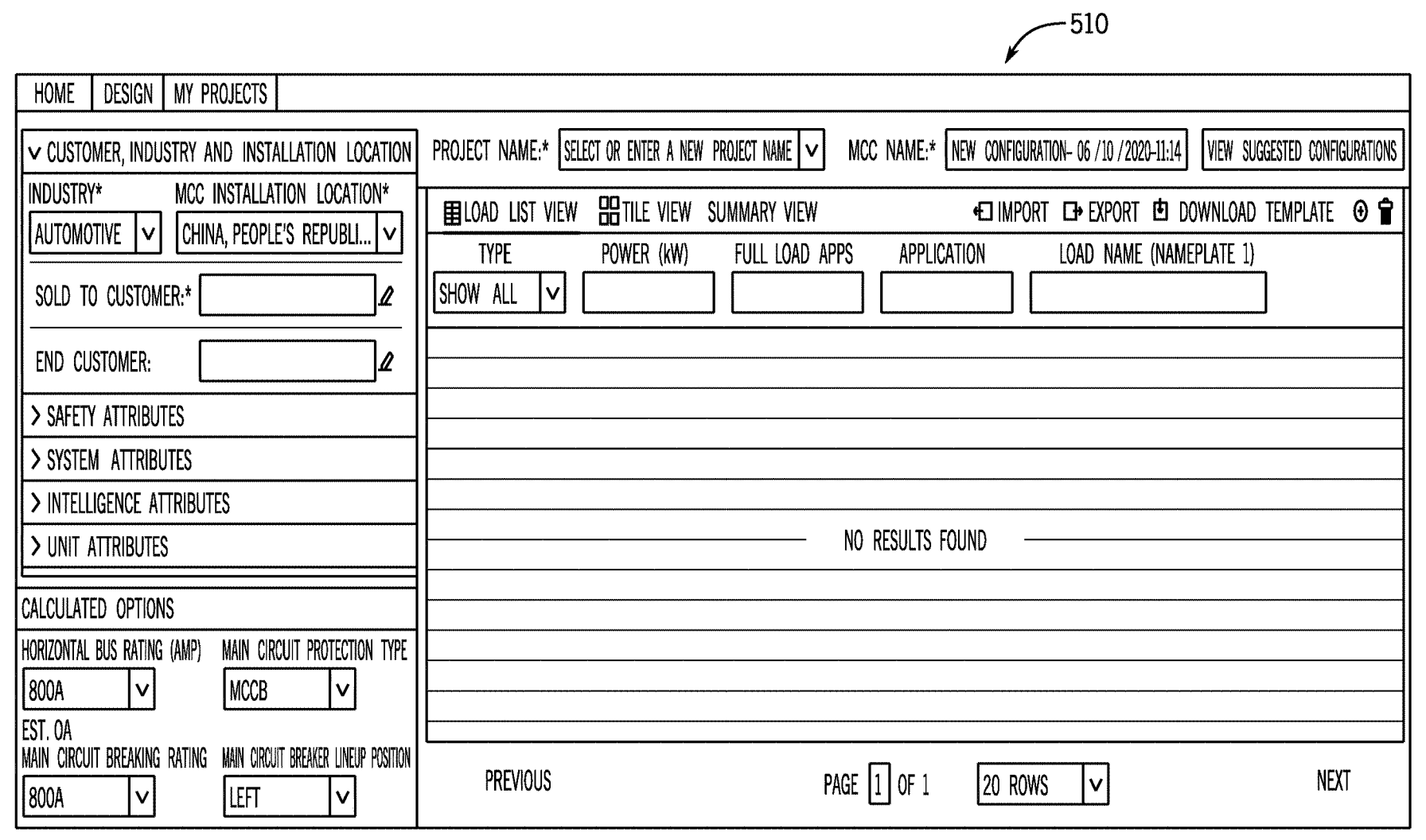

With the guided selling technique in mind from FIG. 14, FIG. 15 illustrates a GUI 510 that depicts selectable inputs for submitting client data, according to one embodiment. For example, the GUI 510 includes inputs for industry, installation location (shown as drop-down menus). While some inputs may be drop-down menus, other inputs may allow text submission. As indicated by the asterisk (*), some of the inputs displayed on the GUI 510 may be required before a set of base designs can be generated. The base design and the one or more option packs have not been generated by a processor (e.g., the processor 126) as indicated by the GUI 510 since the client data had not been submitted by the user.

Figure 16:
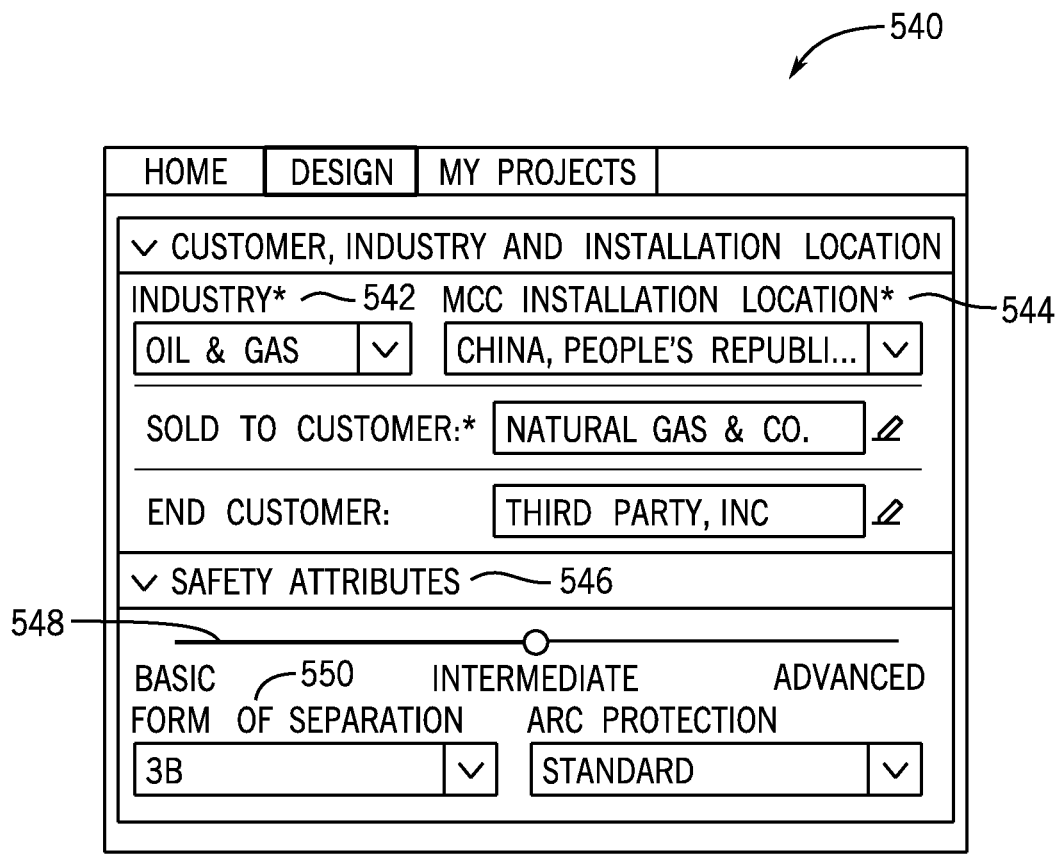
FIG. 16 illustrates a graphical user interface that depicts a slider feature associated with the option packs of FIG. 14, according to one embodiment.

After the client data and the selected base design has been received by the processor, the processor 126 may generate and display one or more option packs corresponding to the selected base design. As such FIG. 16 illustrates a GUI 540 that depicts a sliding widget associated with an option packs, according to one embodiment. Based on inputs such as industry 542 (e.g., oil and gas), installation location 544 (e.g., China), sold to customer, end customer, and the like, the processor may identify an option pack and set a level based on the inputs (as shown by the sliding widget 548). For a safety option pack 546, a processor (e.g., the processor 126) may have determined the level to be intermediate based on the inputs from the client. As mentioned above, the processor 126 may determine a level associated with an option pack based on the client data as well any identified patterns from historical data associated with the client from previous industry device assemblies. For example, safety attributes may vary amongst various regions and industries. After the user has selected the one or more option pack and verified or changed corresponding levels, the processor may automatically populate fields representing parameters of the safety pack option 546 (as shown by 550).

In turn, FIG. 17 illustrates a GUI 570 that depicts the identified parameters associated with an option pack. In the GUI 570, parameters 572 have been identified and displayed by a processor (e.g., the processor 126) for a system option pack 570. The system option pack 570 may include identified parameters 572 related to an industrial operating voltage, a control voltage, a line voltage, a line frequency, a type of line cable entry, types of buses, withstand rating, main current capacity, type of enclosure, percentage of load utilization, a location for load cable exit, a future unit space, and the like. Additionally, the processor 126 may also determine and present calculated options 574 (e.g., main circuit breaker rating, main circuit protection type, horizontal bus rating, main circuit breaker lineup position) for the system option pack 570.

Figure 18:
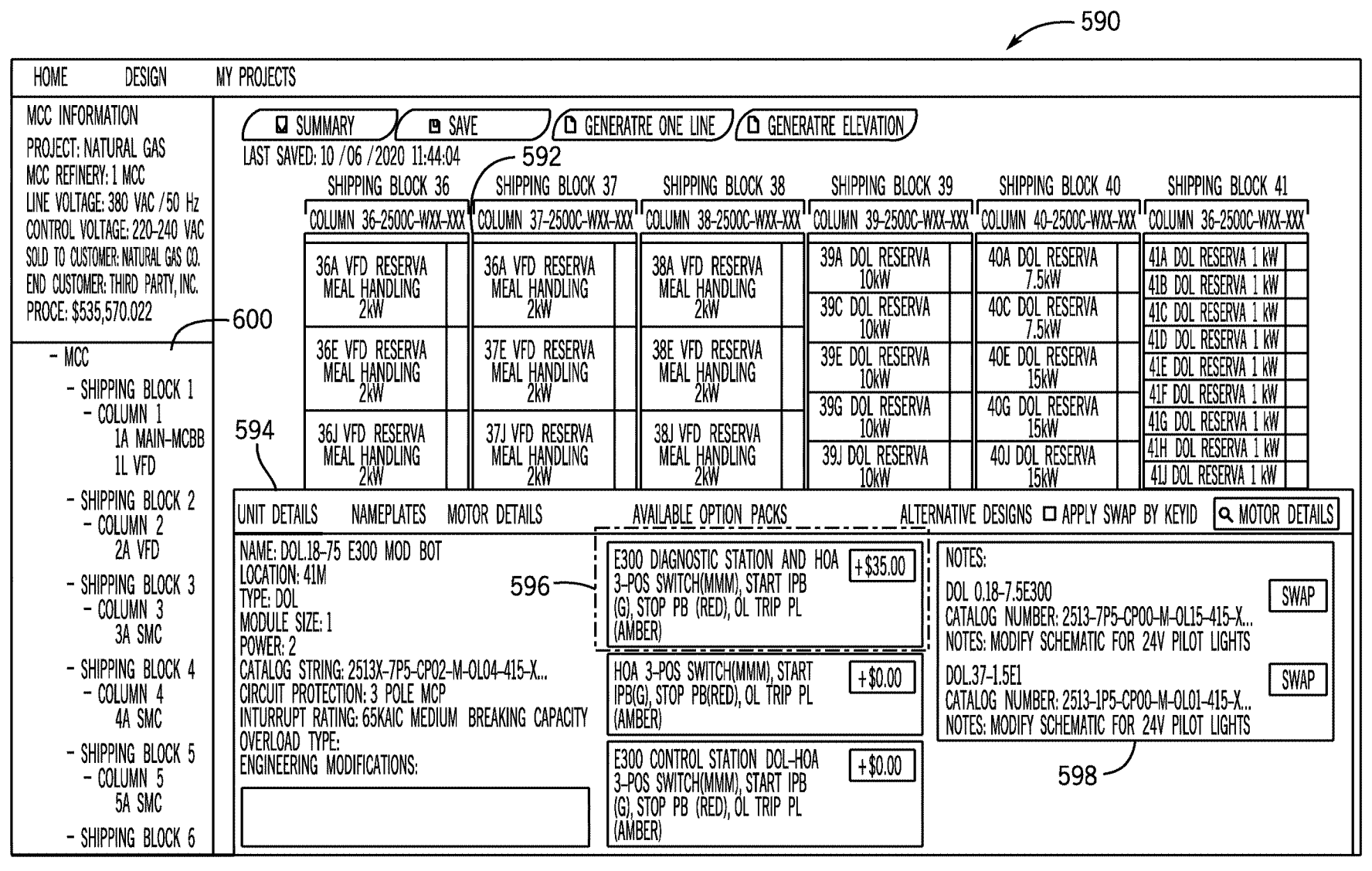

With the above in mind, FIG. 18 illustrates a GUI 590 that indicates a selection of one or more option packs from the one or more option packs identified by the processor, according to one embodiment. The left panel of the GUI 590 represents a collapsible menu associated with the selected base design information. At 596 on the GUI 590, prices for one or more option packs that have been identified by a processor (e.g., the processor 126) are displayed. In some embodiments, 596 may also illustrate prices for one or more options packs that have been selected by the user after the processor 126 has identified the one or more option packs. The GUI 590 illustrates motor details, unit details, and nameplates associated with the selected base design at 594. Additionally, 594 depicts alternative base designs, which will be discussed below.

FIG. 19 illustrates a GUI 620 for swapping the selected base design with another base design, according to one embodiment. The GUI 620 portrays available alternative base designs with descriptions. If the user would like to change the selected base design, the user may select a swap button 622 corresponding to the alternative base design that the use would like to swap the selected base design with.

In summary, embodiments described herein provide a real-time rendering of selected base design and corresponding option packs, supporting modules, and layout (e.g., single-line drawing) which are updated throughout a lifecycle of an industrial automation project. For example, using an intelligent, knowledge-based algorithm, a computing system may provide, via a graphical user interface (GUI), various selectable base designs and option packs to the customer based on customer inputs. By presenting selectable visualizations that correspond to base designs, the customer bypasses having to define each specification and completing numerous questions related to the industrial automation project to submit a purchase order for a particular industrial device assembly.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . "or" step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
   receiving, via a processor, a selection of a visualization via a user input, wherein the visualization represents a base design for an industrial device assembly, wherein the industrial device assembly comprises a plurality of electrical components;
   displaying, via the processor, one or more visualizations that represent one or more types of option packs associated with the industrial device assembly on a display, wherein the one or more types of option packs comprises one or more safety option packs, one or more intelligence option packs, one or more communication option packs, one or more unit option packs, or any combination thereof, and wherein each visualization of the one or more visualizations comprises a slide visualization configured to move to a plurality of selectable levels, and wherein the plurality of selectable levels comprises:
      a first selectable level related to a respective operation of a respective type of option pack of the one or more types of option packs; and
      a second selectable level related to the respective operation of the respective type of option pack, wherein the second selectable level comprises more parameters than the first selectable level;
   receiving, via the processor, a first selection of a first visualization from the one or more visualizations, wherein the first visualization represents corresponds to a first option pack type of the one or more types of option packs;
   receiving, via the processor, a second selection of a first level from a respective plurality of selectable levels associated with the first option pack type;
   identifying, via the processor, a first option pack of one or more option packs based on the first selection and the second selection, wherein the first option pack corresponds to one or more operations related to one or more of the plurality of electrical components, wherein the first option pack comprises:
      a first intelligence option pack of the one or more intelligence option packs, wherein the first selectable level corresponds to a first number of control operations for the one or more of the plurality of electrical components,
      a first communication option pack of the one or more communication option packs, and wherein the first selectable level corresponds to a first level of communication protocol, a first number of communication ports available, or both related to the one or more of the plurality of electrical components, a first unit option pack of the one or more unit option packs, and wherein the first selectable level corresponds to one or more dimensions of a first section of the industrial device assembly that corresponds to the one or more of the plurality of electrical components, a first safety option pack of the one or more safety option packs, and wherein the first selectable level corresponds to a first level of protection, a first amount of protective features, or both related to the one or more of the plurality of electrical components, or any combination thereof;

generating, via the processor, an updated base design based on the first option pack; and displaying, via the processor, a layout based on the updated base design on the display.

2. The method of claim 1, wherein the first amount of protective features comprises voltage isolation, maximum current, one or more clearance distances, a type of shield, a type of wiring, or any combination thereof.

3. The method of claim 1, wherein the layout comprises one or more single-line drawings, one or more elevation drawings, or both.

4. The method of claim 1, wherein the layout comprises a graphical representation indicative of a plurality of positions associated with the plurality of electrical components within the industrial device assembly.

5. The method of claim 4, wherein the graphical representation comprises a scalable vector graphic object for each of the plurality of electrical components within the industrial device assembly.

6. The method of claim 1, wherein the plurality of selectable levels comprises a third selectable level related to the respective operation of the respective type of option pack, wherein the third selectable level comprises more parameters than the first selectable level and less parameters than the second selectable level.

7. The method of claim 1, comprising identifying the one or more types of options packs based on historical data associated with one or more user selections with respect to the base design.

8. The method of claim 1, comprising modifying the updated base design in response to receiving an input to modify the first option pack.

9. A system, comprising:
a processor; and
a memory storing instructions that, when executed by the processor, cause the processor to perform operations comprising:
receiving a selection of a visualization via a user input, wherein the visualization represents a base design for an industrial device assembly, wherein the industrial device assembly comprises a plurality of electrical components;
displaying one or more visualizations that represent one or more types of option packs associated with the industrial device assembly on a display, wherein the one or more types of option packs comprises one or more safety option packs, one or more intelligence option packs, one or more communication option packs, one or more unit option packs, or any combination thereof, and wherein each visualization of the one or more visualizations comprises a slide visualization configured to move to a plurality of selectable levels, and wherein the plurality of selectable levels comprises:

a first selectable level related to a respective operation of a respective type of option pack of the one or more types of option packs; and a second selectable level related to the respective operation of the respective type of option pack, wherein the second selectable level comprises more parameters than the first selectable level;

receiving a first selection of a first visualization from the one or more visualizations, wherein the first visualization represents corresponds to a first option pack type of the one or more types of option packs;

receiving a second selection of a first level from a respective plurality of selectable levels associated with the first option pack type;

identifying a first option pack of one or more option packs based on the first selection and the second selection, wherein the first option pack corresponds to one or more operations related to one or more of the plurality of electrical components, wherein the first option pack comprises:

a first intelligence option pack of the one or more intelligence option packs, wherein the first selectable level corresponds to a first number of control operations for the one or more of the plurality of electrical components, a first communication option pack of the one or more communication option packs, and wherein the first selectable level corresponds to a first level of communication protocol, a first number of communication ports available, or both related to the one or more of the plurality of electrical components, a first unit option pack of the one or more unit option packs, and wherein the first selectable level corresponds to one or more dimensions of a first section of the industrial device assembly that corresponds to the one or more of the plurality of electrical components, a first safety option pack of the one or more safety option packs, and wherein the first selectable level corresponds to a first level of protection, a first amount of protective features, or both related to the one or more of the plurality of electrical components, or any combination thereof;

generating an updated base design based on the first option pack; and displaying a layout based on the updated base design on the display.

10. The system of claim 9, wherein the base design comprises data related to a model, a lineup of the plurality of electrical components, a lead time, a catalog number, a cost, a description, a name, a related industry, or any combination thereof for the industrial device assembly.

11. The system of claim 9, the operations comprising displaying a total a cost of the industrial device assembly, a respective cost for each of the plurality of electrical components, or both based on the updated base design.

12. The system of claim 9, wherein the one or more dimensions comprise length, width, height, weight, or any combination thereof.

13. The system of claim 9, the operations comprising identifying the one or more types of option packs based on a machine learning algorithm configured to monitor one or more user selections with respect to the base design.

14. The system of claim 9, wherein the layout comprises one or more single-line drawings, one or more elevation drawings, or both.

15. A non-transitory computer-readable medium storing instructions that, when executed by a processor, cause the processor to perform operations comprising:

receiving a selection of a visualization via a user input, wherein the visualization represents a base design for an industrial device assembly, wherein the industrial device assembly comprises a plurality of electrical components;

displaying one or more visualizations that represent one or more types of option packs associated with the industrial device assembly on a display, wherein the one or more types of option packs comprises one or more safety option packs, one or more intelligence option packs, one or more communication option packs, one or more unit option packs, or any combination thereof, and wherein each visualization of the one or more visualizations comprises a slide visualization configured to move to a plurality of selectable levels, and wherein the plurality of selectable levels comprises:

a first selectable level related to a respective operation of a respective type of option pack of the one or more types of option packs; and a second selectable level related to the respective operation of the respective type of option pack, wherein the second selectable level comprises more parameters than the first selectable level;

receiving a first selection of a first visualization from the one or more visualizations, wherein the first visualization represents corresponds to a first option pack type of the one or more types of option packs;

receiving a second selection of a first level from a respective plurality of selectable levels associated with the first option pack type;

identifying a first option pack of one or more option packs based on the first selection and the second selection, wherein the first option pack corresponds to one or more operations related to one or more of the plurality of electrical components, wherein the first option pack comprises:

a first intelligence option pack of the one or more intelligence option packs, wherein the first selectable level corresponds to a first number of control operations for the one or more of the plurality of electrical components, a first communication option pack of the one or more communication option packs, and wherein the first selectable level corresponds to a first level of communication protocol, a first number of communication ports available, or both related to the one or more of the plurality of electrical components, a first unit option pack of the one or more unit option packs, and wherein the first selectable level corresponds to one or more dimensions of a first section of the industrial device assembly that corresponds to the one or more of the plurality of electrical components, a first safety option pack of the one or more safety option packs, and wherein the first selectable level corresponds to a first level of protection, a first amount of protective features, or both related to the one or more of the plurality of electrical components, or any combination thereof;

generating an updated base design based on the first option pack; and displaying a layout based on the updated base design on the display.

16. The non-transitory computer-readable medium of claim 15, wherein the plurality of selectable levels comprises a third selectable level related to the respective operation of the respective type of option pack, wherein the third selectable level comprises more parameters than the first selectable level and less parameters than the second selectable level.

17. The non-transitory computer-readable medium of claim 15, wherein the layout comprises one or more single-line drawings, one or more elevation drawings, or both.

18. The non-transitory computer-readable medium of claim 15, the operations comprising:

receiving an input to modify the first option pack after generating the updated based design;

modifying the updated base design based on the input; and displaying the layout based on modifying the updated base design on the display.

19. The non-transitory computer-readable medium of claim 15, the operations comprising identifying the one or more types of options packs based on historical data associated with one or more user selections with respect to the base design.

20. The non-transitory computer-readable medium of claim 15, wherein the first amount of protective features comprises voltage isolation, maximum current, one or more clearance distances, a type of shield, a type of wiring, or any combination thereof.

* * * * *